United States Patent
Sakaue et al.

(10) Patent No.: US 8,174,586 B2
(45) Date of Patent: May 8, 2012

(54) IMAGE FILE REPRODUCTION DEVICE AND IMAGE FILE REPRODUCTION METHOD

(75) Inventors: Shigeo Sakaue, Osaka (JP); Koji Amemiya, Osaka (JP); Yoshimasa Okabe, Osaka (JP); Hironori Katsuura, Osaka (JP); Hisakazu Kobayashi, Hyogo (JP); Toru Takashima, Osaka (JP); Kenji Maeda, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/103,424

(22) Filed: May 9, 2011

(65) Prior Publication Data

US 2011/0211092 A1 Sep. 1, 2011

Related U.S. Application Data

(63) Continuation of application No. 12/255,921, filed on Oct. 22, 2008, now Pat. No. 7,956,904.

(30) Foreign Application Priority Data

Oct. 23, 2007 (JP) ................................. 2007-274999
Nov. 1, 2007 (JP) ................................. 2007-285001

(51) Int. Cl.
*H04N 5/76* (2006.01)
*H04N 5/222* (2006.01)
*H04N 5/228* (2006.01)
*H04N 5/92* (2006.01)
*H04N 5/775* (2006.01)

(52) U.S. Cl. ............. 348/231.2; 348/231.3; 348/333.12; 348/222.1; 386/326; 386/230

(58) Field of Classification Search ............... 348/231.2, 348/231.3, 222.1, 220.1, 333.05, 333.12, 348/333.11; 386/326, 327, 332, 333, 334, 386/224, 230, 210
See application file for complete search history.

(56) References Cited

U.S. PATENT DOCUMENTS

| | | | | |
|---|---|---|---|---|
| 5,724,579 A | * | 3/1998 | Suzuki | ................................. 1/1 |
| 7,480,382 B2 | * | 1/2009 | Dunbar et al. | ................. 380/217 |

(Continued)

FOREIGN PATENT DOCUMENTS

| | | |
|---|---|---|
| JP | 7-245723 | 9/1995 |
| JP | 2005-252754 | 9/2005 |
| JP | 2006-5952 | 1/2006 |

(Continued)

OTHER PUBLICATIONS

International Search Report issued Dec. 9, 2008 in the International (PCT) Application No. PCT/JP2008/003003.

*Primary Examiner* — Nhan T Tran
*Assistant Examiner* — Marly Camargo
(74) *Attorney, Agent, or Firm* — Wenderoth, Lind & Ponack, L.L.P.

(57) ABSTRACT

A method of reproducing an image file from a recording medium that stores an image file of a first type and/or an image file of a second type includes reproducing the first type of image file or second type of image file, detecting whether each of a predetermined number of image files stored on the recording medium is the first type of image file or the second type of image file during the reproduction of an image file, and converting the second type of image file to the first type of image file by reading the main image data from the second type of image file, generating display-image data (image data for display use) based on the read main image data, and storing the generated display-image data in the original image file if the image file is determined to be the second type of image file based on the detection result. The first type of image file is an image file containing a header, main image data, and display-image data, and storing the display-image data in an area other than an area storing the header. The second type of image file is an image file containing a header and main image data, and storing no display-image data in an area other than an area storing the header. The image files of predetermined number being image files that can be reproduced when reproduction is done in the forward and/or reverse direction from the image file being reproduced.

10 Claims, 27 Drawing Sheets

U.S. PATENT DOCUMENTS

| | | |
|---|---|---|
| 2003/0193581 A1 | 10/2003 | Miyata |
| 2005/0243187 A1* | 11/2005 | Watanabe et al. .......... 348/231.2 |
| 2009/0154833 A1* | 6/2009 | Sakaue et al. ................. 382/282 |
| 2009/0167873 A1* | 7/2009 | Sakaue et al. .............. 348/207.2 |

* cited by examiner

*Fig. 4A*  IMAGE INFORMATION IN MAIN HEADER

| | PIXEL COUNT | ROTATION INFORMATION |
|---|---|---|
| IMAGE INFORMATION OF MAIN IMAGE DATA | 1920, 1440 | 90° |

| | START ADDRESS | DISPLAY-IMAGE IDENTIFIER | IMAGE TYPE | ASPECT RATIO | ROTATION INFORMATION |
|---|---|---|---|---|---|
| IMAGE INFORMATION OF DISPLAY-IMAGE DATA | 5678 | 1 | VGA | 4:3 | 90° |

*Fig. 4B*  IMAGE INFORMATION FOR DISPLAY-IMAGE

| | PIXEL COUNT | ROTATION INFORMATION |
|---|---|---|
| IMAGE INFORMATION OF DISPLAY-IMAGE DATA | 640, 480 | 90° |

IMAGE FILE REPRODUCTION DEVICE AND IMAGE FILE REPRODUCTION METHOD

This is a Rule 1.53(b) Continuation of application Ser. No. 12/255,921, filed Oct. 22, 2008 now U.S. Pat. No. 7,956,904

BACKGROUND OF THE INVENTION

1. Field of the Invention

The present invention relates to a device for processing image file, such as reproduction and transmission of image files, and more particularly to a device for reproducing an image file including image data for display use in addition to main image data.

2. Related Art

JP-A-2006-005952 teaches a digital still camera (referred to simply a "digital camera" below) that creates an image file storing image data for display use (referred to as "display-image data") other than a thumbnail image data.

This digital camera creates preview image data and thumbnail image data (160 horizontal dots×120 vertical dots, for example) from the captured image data (1920 horizontal dots×1440 vertical dots, for example). The pixel count (the number of pixels) of the preview image data matches that of the liquid crystal display (LCD) monitor on the digital camera (320 horizontal dots×240 vertical dots, for example). The thumbnail image data is data used for displaying thumbnails on the LCD of the digital camera. The digital camera manages the captured image data, the preview image data, and the thumbnail image data in the same image file.

This enables the digital camera to instantly display a preview image or thumbnail images on the LCD.

An advantage of storing display-image data other than the thumbnail image data in the image file is that either image can be displayed instantly. A disadvantage, however, is that because multiple versions of the same image data are contained in the image file, the processes for generating, reproducing, and transmitting the image files are complicated, and that because the size of the image file increases, the process including transmission takes longer. As a result, an image file processing device that is sufficiently easy to use cannot be provided by simply storing display-image data in the image file.

SUMMARY OF THE INVENTION

The present invention is directed to solving the foregoing problem and provides a user-friendly and easy-to-use image file processing device that generates, reproduces, and transmits image files storing display-image data which is not thumbnail image data.

An image file reproduction device according to the invention is a reproduction device for reproducing an image file from a recording medium storing an image file of a first type and/or an image file of a second type. The first type of image file is an image file which contains a header, main image data, and display-image data which is image data for display use, and stores the display-image data in an area other than an area storing the header. The second type of image file is an image file which contains a header and main image data, and stores no display-image data in an area other than an area storing the header.

The reproduction device includes: a reproduction unit that can reproduce the first type of image file and second type of image file; a detector that detects whether each of a predetermined number of image files stored on the recording medium is the first type of image file or the second type of image file while the reproduction unit reproduces an image file; and an image file converter that converts the second type of image file to the first type of image file by reading the main image data from the second type of image file, generating display-image data based on the read main image data, and storing the generated display-image data in the original image file when the image file is detected to be the second type of image file based on the detection result. The image files of predetermined number are image files that can be reproduced when reproduction is done in the forward and/or reverse direction from the image file being reproduced.

An image file reproduction method according to the invention is a method for reproducing an image file from a recording medium storing an image file of a first type and/or an image file of a second type. The first type of image file is an image file which contains a header, main image data, and display-image data which is image data for display use, and stores the display-image data in an area other than an area storing the header. The second type of image file is an image file which contains a header and main image data, and stores no display-image data in an area other than an area storing the header. The reproduction method includes: reproducing the first type of image file and second type of image file; detecting whether each of a predetermined number of image files stored on the recording medium is the first type of image file or the second type of image file while reproducing the image file; converting the second type of image file to the first type of image file by reading the main image data from the second type of image file, generating display-image data based on the read main image data, and storing the generated display-image data in the original image file when the image file is detected to be the second type of image file based on the detection result. The image files of predetermined number are image files that can be reproduced when reproduction is done in the forward and/or reverse direction from the image file being reproduced.

The invention can thus prepare display-image data for the image files located before and after the currently displayed image file, and thus enables rapidly reproducing forward and back while displaying the images.

Other possible aspects of the invention are described below.

(1) A first image file generation device according to the invention may have main image data acquisition means for acquiring main image data; display-image data generating means for generating display-image data based on the main image data or image data which is source data of the main image data; and image file generating means for generating an image file. The image file includes a header, main image data, and display-image data, and stores the display-image data in an area other than the header. The header stores information relating to the display-image data. With this arrangement, the display-image data can be interpreted by simply reading information related to the display-image data stored in the header. Thus the display-image data can be quickly searched.

(2) A second image file generation device according to the invention may include main image data acquisition means for acquiring main image data; display-image data generating means for generating display-image data based on the main image data or image data which is source data of the main image data; image file generating means for selectively generating a first type of image file or a second type of image file; and file type selection means for instructing the image file generating means to generate the first type of image file or second type of image file. The first type of image file is an image file that includes a header, main image data, and display-image data, and stores the display-image data in an area other than the header. The second type of image file is an image file that has a header and main image data, but stores no display-image data in an area other than an area storing the header. This enables generating image files as desired by the user.

(3) A third image file generation device according to the invention may include main image data acquisition means for acquiring main image data; display-image data generating means for generating display-image data based on the main image data or image data which is source data of the main image data; and image file generating means for generating an image file. The image file includes a header, main image data, and display-image data, and stores the display-image data in an area other than the header. The image file can store plural pieces of display-image data, and the plural pieces of display-image data are stored in a predetermined order in the image file. In this manner, the plural pieces of display-image data are stored in a predetermined order, and thus searching is made easier.

(4) A fourth image file generation device according to the present invention may include main image data acquisition means for acquiring main image data, display-image data generating means for generating display-image data based on the main image data or image data which is source data of the main image data, and image file generating means for generating an image file. The image file includes a header, main image data, and display-image data, and stores the display-image data in an area other than the header. The main image data acquisition means can acquire a plurality of main image data through continuous shooting. After the main image data acquisition means finishes acquiring plural pieces of main image data through a series of the continuous shooting, the image file generating means starts generation of image file for each piece of the main image data. Thus, the processing power of the controller can be concentrated on acquiring process of the main image data during the continuous shooting. Accordingly, the load on the processor by processes other than main image data acquisition can be reduced while taking continuous shooting, and thus the continuous shooting operation can be done at high speed.

(5) A fifth image file generation device according to the present invention may include main image data acquisition means for acquiring main image data; setting means that sets pixel count of the display-image data, display-image data generating means for generating display-image data according to the setting from the setting means based on the main image data or image data which is source data of the main image data, and image file generating means for generating an image file. The image file includes a header, main image data, and display-image data, and stores the display-image data in an area other than the header. As a result, the pixel count of the display-image data can be set as desired. The user can therefore generate an image file storing display-image data of the desired size.

The fifth image file generation device may also have a communication means for communicating with a display device for displaying the display-image data, and a data acquisition means for acquiring pixel count of the display device through the communication means. The setting means may set the pixel count of the display-image data according to the acquired pixel count information. With this arrangement, the pixel count of the display-image data can be set automatically, and thus there is no need for the user to set the pixel count, improving user convenience.

(6) A sixth image file generation device according to the present invention may include main image data acquisition means for acquiring main image data; display-image data generating means for generating display-image data based on the main image data or image data which is source data of the main image data; and image file generating means for generating an image file. The image file includes a header, main image data, and display-image data, and stores the display-image data in an area other than the header. The display-image data generating means can generate display-image data with a different aspect ratio than that of the main image data. As a result, the aspect ratio of the display-image data can be set as desired, and the user can generate an image file storing display-image data with the desired aspect ratio.

(7) A seventh image file generation device according to the present invention includes main image data acquisition means for acquiring main image data; display-image data generating means for generating display-image data based on the main image data or image data which is source data of the main image data; and image file generating means for generating an image file. The image file includes a header, main image data, and display-image data, and stores the display-image data in an area other than the header. The image file can store plural pieces of display-image data. The plural pieces of display-image data stored in the image file have different aspect ratios. With this arrangement, display-image data of different aspect ratios are stored in a single image file, and thus the suitable display-image data can be read and reproduced according to the reproduction status.

(8) An eighth image file generation device according to the present invention may include main image data acquisition means for acquiring main image data; generating method selection means for setting one of plural display-image data generating methods that are used for generating the display-image data; display-image data generating means for generating display-image data based on the main image data or the image data which is source data of the main image data according to the set generating method; and image file generating means for generating an image file. The image file includes a header, main image data, and display-image data, and stores the display-image data in an area other than the header. As a result, the method of converting the aspect ratio of the display-image data can be set as desired, and the user can therefore generate an image file storing the desired display-image data.

In the eighth image file generation device, the display-image data generating means can use a plurality of generating methods to generate, from the main image data, display-image data with different aspect ratio than that of the main image data, and the generating method selection means can set one of the plural methods to be used for generating the display-image data. As a result, the method of converting the aspect ratio of the display-image data can be set more easily.

(9) The ninth image file generation device of the invention may include main image data acquisition means for acquiring main image data, display-image data generating means for generating display-image data with a different aspect ratio than the aspect ratio of the main image data by generating an effective image area based on the main image data or the image data which is source data of the main image data according to a predetermined method and combining the effective image area and no-image-signal area; and an image file generating means for generating an image file that includes a header, main image data, and display-image data, and stores the display-image data in an area other than the header. The image file generating means stores identification information identifying the effective image area in the header. With this arrangement, information identifying the effective image area is stored in the header, and the effective image area can be extracted from the display-image data by referring to the information. As a result, the invention can be used with processes that use only the data in the effective image area, such as when printing.

(10) A tenth image file generation device according to the present invention may include main image data acquisition means for acquiring main image data, image rotation command receiving means for receiving a command to rotate the main image data, display-image data generating means for generating rotated display-image data based on the main image data or the image data which is source data of the main image data by rotating it according to the rotate command when the image rotation command receiving means receives a rotate command, image file generating means for generating an image file when the image rotation command receiving means receives a rotate command. The image file includes a header storing rotation information indicating the rotate command, the main image data that is not rotated, and the display-image data that is rotated, and stores the display-image data in an area other than the header. With this arrangement, the display-image data which is rotated is stored in the image file, and thus it is not necessary to rotate the display-image data when the display-image data is reproduced. The display-image data can therefore be reproduced rapidly.

In the tenth image file generation device, the display-image data generating means may change the pixel count of the rotated display-image data according to the angle of rotation indicated by the rotate command. As a result, the display-image data can be generated in a size suitable to the display when the display-image data is first generated.

In the tenth image file generation device, when a rotate command for rotating display-image data with a landscape orientation to display-image data in a portrait orientation is received, the display-image data generating means may change the pixel count of the display-image data after rotation so that the vertical pixel count of the display-image data in portrait orientation equals the vertical pixel count of the display-image data in landscape orientation. The portrait image is thus sized to fit in the display screen, and thus it is not necessary to change the pixel count again when reproducing the display-image data in the portrait mode.

(11) A image file editing device according to the present invention may include an image file acquisition means for acquiring an image file, the image file including a header, main image data, and display-image data and storing the display-image data in an area other than the header; image rotation command receiving means for receiving a command to rotate the main image data; display-image data generating means for generating rotated display-image data according to the rotate command when the image rotation command receiving means receives a rotate command, and image file changing means for storing rotation information indicating the rotate command in the header and storing in the image file the display-image data after rotation instead of or in addition to the display-image data before rotation when the image rotation command receiving means receives a rotate command. With this arrangement, even after the image file is generated, the processor load in reproducing process of the rotated display-image data can be reduced by rotating the display-image data and storing the rotated display-image data in the image file.

In the image file editing device according to the present invention, the display-image data generating means may generate the rotated display-image data based on the main image data or the image data which is source data of the main image data. As a result, degradation of the rotated display-image data can be prevented.

(12) A first image data transmission device according to the present invention may include communication means that can communicate with an external device; data acquisition means for acquiring a command from the external device; storage means for storing an image file, the image file including a header, main image data, plural pieces of display-image data generated based on the main image data or image data which is source data of the main image data and storing the display-image data in an area other than the header; extraction means for extracting one piece or plural pieces of display-image data from the image file according to a command from the external device; and transmission means for sending the extracted image data through the communication means. As a result, it is possible to send display-image data with pixel count matching the external device to which the image data is sent.

(13) A second image data transmission device according to the present invention may include a communication means that can communicate with an external device; data acquisition means for acquiring a command from an external device; storage means that stores an image file, the image file containing a header, main image data, and one piece or plural pieces of display-image data generated based on the main image data or image data which is source data of the main image data and storing the display-image data in an area other than the header; extraction means for extracting the main image data and one piece or plural pieces of display-image data from the image file according to a command acquired from the external device, and a transmission means for transmitting the extracted image data through the communication means. As a result, the main image data is transmitted when display-image data with a pixel count suitable to the destination external device is not stored in the image file. Thus, the problem that image data can not be sent to the external device can be prevented.

In the first or second image data transmission device, the command from the external device may be an instruction related to the pixel count of the external device. As a result, display-image data with a pixel count suitable to the destination external device can be transmitted.

In the first or second image data transmission device, the command from the external device may indicate the type of external device. As a result, display-image data with a pixel count suitable to the destination external device can be transmitted.

(14) A third image data transmission device according to the present invention may include a communication means that can communicate with an external device; a transmission command acquisition means for acquiring a command for transmission of display-image data from the external device; storage means for storing an image file, the image file including a header, main image data, and plural pieces of display-image data generated based on the main image data or image data which is source data of the main image data, and storing the display-image data in an area other than the header; extraction means for extracting the display-image data with the highest pixel count among the plural pieces of display-image data from the image file according to the command acquired from the external device; and transmission means for transmitting the extracted image data through the communication means.

(15) An image file transmission device according to the present invention may include a communication means that can communicate with an external device; a data acquisition means for acquiring a command from the external device; storage means for storing an image file, the image file including a header, main image data, and plural pieces of display-image data generated based on the main image data or image data which is source data of the main image data, and storing the display-image data in an area other than the header; and transmission means for transmitting the image file with the display-image data removed through the communication means according to the command acquired from the external device. As a result, even if the destination external device is not compatible with an image file storing display-image data, the image file can be handled by the external device because the image file is transmitted after converted to a file containing no display-image data.

In the image file transmission device according to the present invention, the command from the external device may indicate whether the external device can handle image files containing display-image data.

(16) An eleventh image file generation device according to the present invention may include a main image data acquisition means for acquiring main image data; display-image data generating means for generating display-image data based on the main image data or image data which is source data of the main image data according to setting set in advance or selectively for generating display-image data so as to fit inside a pixel area having a predetermined aspect ratio and predetermined vertical and horizontal pixel counts; and an image file generating means for generating an image file. The image file includes a header, main image data, and display-image data, and stores the display-image data in an area other than the header. The display-image data generating means can generate the display-image data with the same aspect ratio as the main image data while also fitting in the pixel area even if the aspect ratio of the main image data differs from the aspect ratio of the setting.

As a result, even if the aspect ratio of the main image data differs from the aspect ratio in the setting, display-image data can be generated without changing the composition of the main image and without adding extra data. If it is configured to insert black areas when the aspect ratio of the main image data differs from the aspect ratio in the setting, the black area may possibly be inserted into an area which is essentially needed. If it is configured to crop the top and bottom of the main image data to generate the display-image data in the same case, a part of the effective pixel area may possibly be deleted. Thus the composition of the display-image data may differ from that of the main image data. To the contrary, the invention enables generation of display-image data without changing the composition of the main image and without adding extra data, and the size of the display-image data is not increased unnecessarily. In addition, when the image data is sent to an external device such as a printer only requiring the essentially necessary part of the image, the external device does not need to execute a process for removing unnecessary parts from the display-image data. In the eleventh image file generation device according to the present invention the display-image data generating means generates the display-image data with the highest pixel count that will fit in the pixel area. As a result, the display-image data can be generated with the highest resolution without changing the format of the main image and without adding extra data.

In the eleventh image file generation device according to the present invention, the display-image data generating means may generate the display-image data so that the display-image data has the largest pixel count while fitting in the pixel area.

In the eleventh image file generation device according to the present invention, the display-image data generating means may generate the display-image data so that either the vertical or horizontal pixel count of the display-image data is the same as the vertical or horizontal pixel count of the pixel area.

(17) A twelfth image file generation device according to the present invention may include main image data acquisition means for acquiring main image data; display-image data means for generating display-image data based on the main image data or image data which is source data of the main image data; and image file generating means for generating an image file. The image file includes a main header, main image data, a display-image header and display-image data, and stores the display-image data in an area other than an area storing the main header. The main header stores main image information that is image information related to the main image data, and first display-image information that is image information related to the display-image data. The display-image header stores second display-image information that is image information related to the display-image data. The main image information and the second display-image information share at least one item (type) of image information. The items (types) of image information included in the first display-image information are different from the items of image information included in the second display-image information.

Since at least one item of image information included in the main image information and the second display-image information is the same, the second display-image information can be stored in the header of a new image file without greatly changing the second display-image information when the main image and display-image are separated and stored in different image files. In addition, the items of image information in the second display-image information and the items of image information in the first display-image information are different, and thus information sufficient to manage the display-image data can be stored in the first display-image information. As a result, the display-image data can be searched quickly and reliably.

According to the invention, during display of image file, display-image data can be provided in advance for image files stored before and after the image file being displayed. Thus, image feed operation in forward and/or back direction during image reproduction can be done rapidly. Accordingly, the invention can provide a user-friendly and easy-to-use image file reproduction device.

BRIEF DESCRIPTION OF THE DRAWINGS

FIGS. 4A and 4B schematically describe types of image information.

DETAILED DESCRIPTION OF THE PREFERRED EMBODIMENTS

Table of Contents

Figure 1:
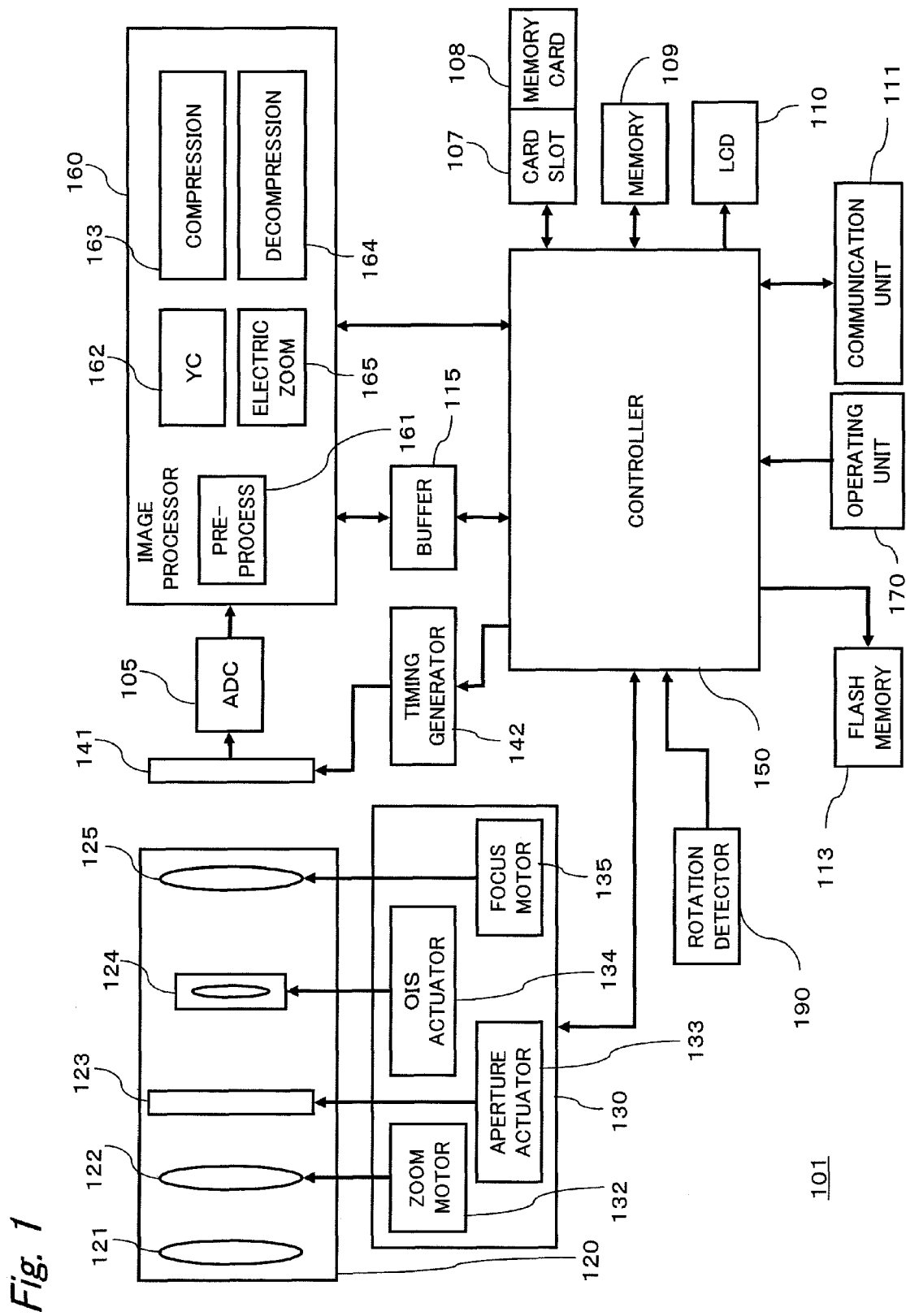
FIG. 1 is a block diagram showing the configuration of a digital camera according to a preferred embodiment of the present invention.

1 First Embodiment
  1-1 Configuration
    1-1-1 Configuration of a digital camera
    1-1-2 Configuration of the back of the digital camera
    1-1-3 Data structure of the image file format
      1-1-3-1 File structure
      1-1-3-2 Main image part
      1-1-3-3 Sub image part
      1-1-3-4 Image information
    1-1-4 Relationship to the invention
  1-2 Recording operation
    1-2-1 Flow of Recording operation
    1-2-2 Recording in a continuous shooting mode
    1-2-3 Various setting for Recording
      1-2-3-1 Setting for pixel count of the display-image data
      1-2-3-2 Setting for the aspect ratio of the display-image data
      1-2-3-3 Generating method of display-image data with different aspect ratio
      1-2-3-4 Recording with the rotated camera -continued Table of Contents 1-3 Reproduction operation
    1-3-1 Flow of reproduction operation
    1-3-2 Accelerating the reproduction process
  1-4 Transmission of image data
    1-4-1 Flow of image file transmission
    1-4-2 PictBridge compatibility
2 Second Embodiment
  2-1 Flow of image file transmission
3 Third Embodiment
  3-1 Generated image file
  3-2 Generating method of the display-image data
    3-2-1 When aspect ratio of the main image data is 4:3
    3-2-2 When aspect ratio of the main image data is 16:9
  3-3 Summary of the third embodiment
4 Other Embodiments Preferred embodiments of the present invention are described below with reference to the accompanying figures. Note that parts that are functionally the same as parts that have already been described are identified by the same reference numerals, and further description thereof is omitted.

1 First Embodiment

A first embodiment of a digital camera according to the present invention is described next.

1-1 Configuration 1-1-1 Configuration of a Digital Camera

FIG. 1 is a block diagram showing the configuration of a digital camera 101 according to a first embodiment of the invention. This digital camera 101 photographs subjects formed by an optical system 120 on a CCD image sensor 141. The image data captured by the CCD image sensor 141 is then processed by an image processor 160 and stored on a memory card 108 or internal memory 109. The image data stored on the memory card 108, for example, can be displayed on an LCD monitor 110. The configuration of this digital camera 101 is described below.

The optical system 120 includes an objective lens 121, zoom lens 122, aperture 123, optical image stabilization (OIS) unit 124, and a focus lens 125. The optical system 120 focuses light from the subject and forms the subject image.

The objective lens 121 is the lens closest to the subject. The zoom lens 122 enlarges or reduces the subject image by moving along the optical axis of the optical system 120. The aperture 123 adjusts the size of the lens opening as controlled automatically or manually by the user to adjust the amount of light passing through the optical system 120. The OIS unit 124 has an internal correction lens that can move in the plane perpendicular to the optical axis. The OIS unit 124 reduces subject blur by driving the correction lens in the direction that cancels movement of the digital camera 101. The focus lens 125 adjusts the focus of the subject by moving along the optical axis of the optical system 120.

A drive system 130 drives the optical elements of the optical system 120.

A zoom motor 132 drives the zoom lens 122 along the optical axis of the optical system 120. The zoom motor 132 may drive the zoom lens 122 using a cam mechanism or a ball and screw mechanism, for example. The zoom motor 132 may be a pulse motor, a DC motor, a linear motor, a servo motor, or other type of motor.

The aperture actuator 133 is a drive unit for changing the size of the opening of the aperture 123. The aperture actuator 133 can be achieved using a motor, for example.

The OIS actuator 134 drives the correction lens inside the OIS unit 124 in the plane perpendicular to the optical axis. The OIS actuator 134 may be a flat coil or ultrasonic motor, for example.

The focus motor 135 drives the focus lens 125 along the optical axis of the optical system 120. The focus motor 135 may drive the focus lens 125 using a cam mechanism or a ball and screw mechanism, for example. The focus motor 135 may be a pulse motor, a DC motor, a linear motor, a servo motor, or other type of motor. Alternatively, the focus motor 135 may be omitted and the zoom motor 132 used as the drive means for driving both the zoom lens 122 and the focus lens 125.

The CCD image sensor 141 captures the subject image formed by the optical system 120 to generate image data. The timing generator 142 generates the timing signal for driving the CCD image sensor 141. The CCD image sensor 141 controls various operations including exposure, data transfer, and the digital shutter according to the timing signal supplied by the timing generator 142. An analog/digital (A/D) converter 105 converts the image data generated by the CCD image sensor 141 to a digital signal.

The image processor 160 applies various processes to the image data converted by the A/D converter 105. The image processor 160 processes the image data generated by the CCD image sensor 141 to generate image data to be stored in a memory card 108 and/or image data to be displayed on the LCD monitor 110. The image processor 160 also processes the image data stored in the memory card 108 to generate image data to be displayed on the LCD monitor 110, image data to be stored again to the memory card 108, and/or image data to be sent through a communication unit 111 to an external device. The image processor 160 may be configured using a DSP or microprocessor, for example.

A preprocessor 161 applies various image processing operations, such as gamma correction, white balance correction, and scratch removal to the image data converted by the A/D converter 105. The YC conversion unit 162 converts RGB image data to image data represented by YC (Y=luminance, C=chrominance) signals.

The digital zoom processing unit 165 digitally enlarges or reduces the image data. When digitally enlarging or reducing the image data, the digital zoom processing unit 165 appropriately applies process including interpolation, subsampling, and cropping to the image data. More specifically, the digital zoom processing unit 165 is a means for converting the pixel count of the image data.

The compression unit 163 compresses the YC image data using a DCT (discrete cosine transform), Huffman encoding, or other technique. The compression unit 163 preferably compresses the image data using a compression method compatible with the JPEG format, but the invention is not limited to using JPEG image data.

The expansion unit 164 decodes the compressed image data to the uncompressed form when displaying compressed image data stored in the memory card 108 on the LCD monitor 110, for example.

The controller 150 is a control means for controlling overall operation of the digital camera 101. The controller 150 may be rendered using a semiconductor chip, for example. The controller 150 may be rendered as a hardware-only device or using a combination of both hardware and software. The controller 150 may be rendered using a microprocessor.

Buffer memory 115 functions as working memory for the image processor 160 and controller 150. The buffer memory 115 may be rendered using DRAM or ferroelectric memory, for example. A card slot 107 accommodates a removable memory card 108. The card slot 107 enables mechanically and electrically connecting the memory card 108.

The memory card 108 has internal flash memory or ferroelectric memory for storing data.

The internal memory 109 can be rendered using flash memory or ferroelectric memory, for example. The controller 150 can store the generated image files to the memory card 108 or the internal memory 109. The controller 150 can also read image files stored in the memory card 108 and write the files to internal memory 109, or read image files stored in the internal memory 109 and write the files to the memory card 108.

The LCD monitor 110 can display the images presented by the image data generated by the CCD image sensor 141, and images presented by the image data read from the memory card 108, for example. The LCD monitor 110 can also display the settings of the digital camera 101. The LCD monitor 110 can, for example, display the exposure value (EV).

The communication unit 111 is a means for communicating with an external device. The communication unit 111 can be rendered using a wireless LAN or a USB communication unit, for example. The operating unit 170 collectively refers to various operating devices. The operating unit 170 receives instructions from the user and communicates those instructions to the controller 150. The flash 113 emits light to illuminate the subject.

The rotation detector 190 detects rotation of the digital camera 101. The controller 150 can acquire information about the rotation of the digital camera 101 detected by the rotation detector 190. The rotation detector 190 may be rendered using a rotation sensor or angle sensor. The OIS actuator 134 may function as the rotation detector 190. This is because the OIS actuator 134 can detect how much the camera body has been tilted from the drive current level.

1-1-2 Configuration of the Back of the Digital Camera

Figure 2:
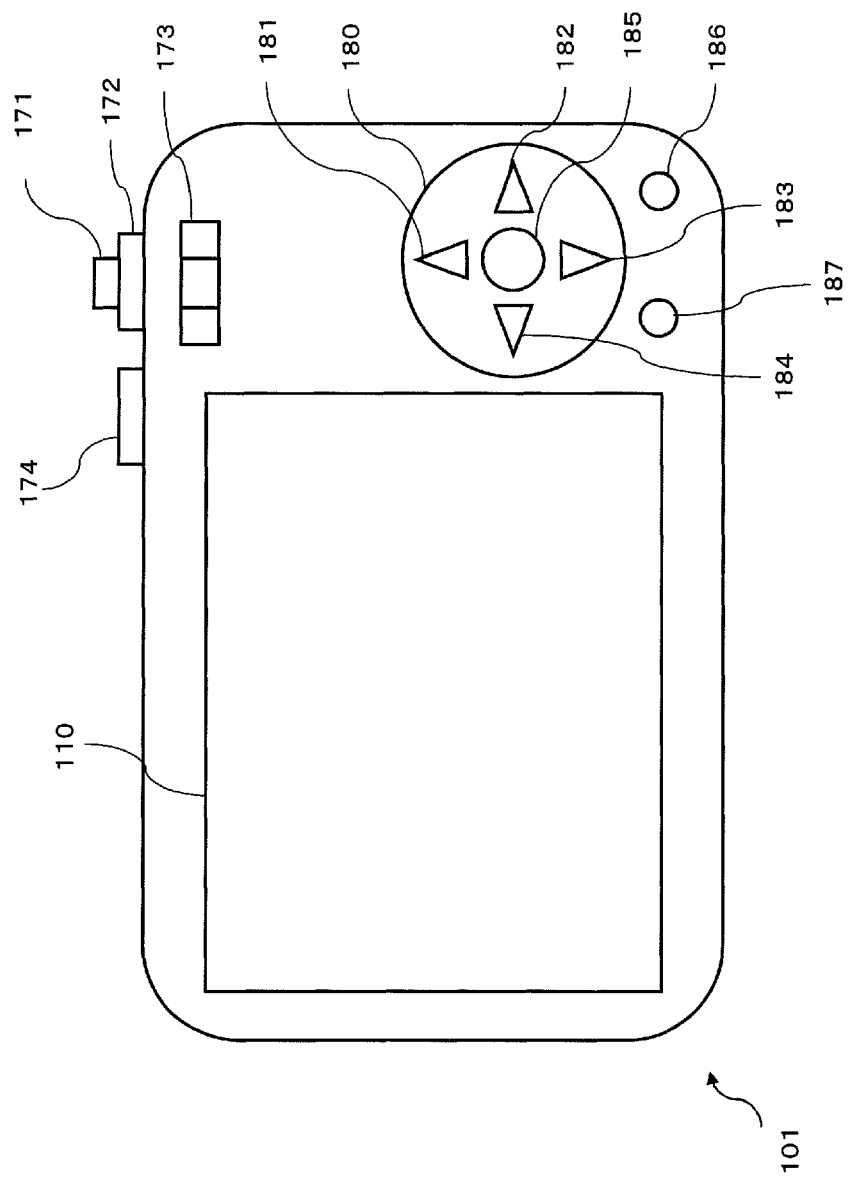
FIG. 2 shows the back of the digital camera according to a preferred embodiment of the present invention.

FIG. 2 shows the back of the digital camera 101 according to this first embodiment of the invention. Various operating units are described below with reference to FIG. 2.

A shutter release button 171, zoom dial 172, and mode dial 174 are disposed on top of the camera body. The shutter release button 171 detects when it is depressed. When the shutter release button 171 is depressed part way, the controller 150 starts automatic exposure (AE) control or automatic focus (AF) control. When the shutter release button 171 is depressed all the way, the digital camera 101 takes a picture.

The zoom dial 172 is disposed so that it can be rotated around the shutter release button 171. As the zoom dial 172 is rotated, the controller 150 starts optical zoom control or digital zoom control.

The mode dial 174 is operated by rotating it. A dial is disposed to the mode dial 174 and the operating modes of the digital camera 101 are assigned to specific positions on the dial. The operating modes of the digital camera 101 include a reproduction (view) mode and a recording mode. The controller 150 controls the digital camera 101 in the operating mode indicated by the mode dial 174 according to the rotational position of the mode dial 174.

A power switch 173, cursor key 180, delete button 186, and the LCD monitor 110 are disposed on the back of the camera body. The power switch 173 is slidable. The power switch 173 switches the power state of the digital camera 101 according to the sliding position.

The LCD monitor 110 displays image data stored in the memory card 108 and operating menus according to the operating mode selected by the mode dial 174.

The cursor key 180 detects operation of five buttons, including four directional buttons and a center button. The controller 150 controls the content displayed on the LCD monitor 110, including changing the displayed image data, based on how the cursor key 180 is operated.

The delete button 186 detects when it is depressed. The controller 150 detects the preselected image data according to operation of the delete button 186.

1-1-3 Data Structure of the Image File Format

1-1-3-1 File Structure

Figure 3:
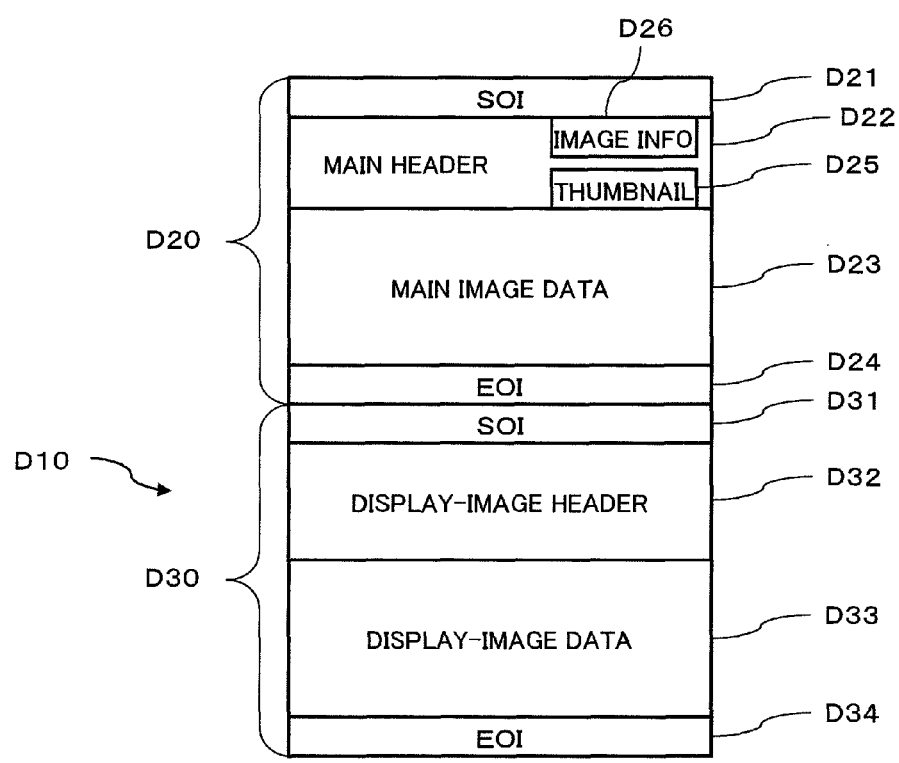
FIG. 3 shows the data structure of a multiple image file.

FIG. 3 shows the data structure of a multiple image file that is handled by the digital camera 101 according to this embodiment of the invention.

This multiple image file contains image data for a plurality of images. In the example shown in FIG. 3 the multiple image file D10 stores main image data D23 and display-image data D33. The display-image data is image data that is generated based on the main image data or the image data which is original of the main image data. The display-image data is generated by image processing, such as subsampling, interpolation, or other method, to the main image data or the image data which is original of the main image data. The display-image data is stored in an area other than the main header D22.

In FIG. 3, a single piece of display-image data is stored in the image file, however this embodiment of the invention may store plural pieces of display-image data in the image file. For example, plural pieces of display-image data with different aspect ratios may be stored as the display-image data. This enables instantly displaying an image with the aspect ratio best suited to the aspect ratio of the image display device to which the digital camera 101 is connected.

Display-image data for plural images of different pixel counts can also be stored as the display-image data. This enables instantly displaying an image with the pixel count best suited to the pixel count of the image display device to which the digital camera 101 is connected.

The FAT (File Allocation Table) stored in the memory card 108 manages the multiple image file D10 as a single file by managing the header marker D21 and footer marker D34. the controller 150 identifies and manages the image files by reading the FAT.

The multiple image file D10 contains a main image part D20 and a sub image part D30. The structures of the main image part D20 and the sub image part D30 of the multiple image file D10 are separately described below.

1-1-3-2 Main Image Part

The main image part D20 includes the Start Of Image marker D21, main header D22, main image data D23, and End Of Image marker D24.

The Start Of Image (SOI) marker D21 is a marker indicating the starting point of the multiple image file D10. The Start Of Image marker D21 is, for example, the start value (xFFD8) of a JPEG image file.

The main header D22 stores management data for the entire multiple image file D10. This management information includes, for example, the thumbnail image data D25 and image information D26.

The thumbnail image data D25 is reduced image data based on the main image data D23. The thumbnail image data D25 has an image size of, for example, 160 horizontal dots and 120 vertical dots. The thumbnail image data D25 is stored in the main header D22 according to the Exif standard.

The image information D26 is information relating to image data such as the main image data D23 or display-image data D33, such as information relating to the pixel count, aspect ratio, and rotation of the image. This format enables acquiring information about the image data by referencing only the main header D22, thereby enabling the controller 150 to quickly process the multiple image file D10. For example, if display-image data with a pixel count conforming to the HDTV (High Definition Television) standard is stored in the display-image data D33, the main header D22 stores information denoting "HDTV" as the image information D26. This enables the controller 150 to easily find display-image data matching the pixel count of the display device that will display the image by simply interpreting the main header D22 instead of interpreting the image data in the multiple image file D10.

The main image data D23 is the image data captured by the digital camera 101 and compressed to the JPEG format.

The End Of Image (EOI) marker D24 is the marker (xFFD9) indicating the end of the main image part D20. By inserting this marker at the end of the main image part D20, it is not necessary to add new Start Of Image (SOI) and End Of Image (EOI) markers to new image files when the multiple image file D10 is divided into the new image files including an image file composed of the main image part D20 and an image file composed of the sub image part D30. As a result, the image files can be easily separated.

1-1-3-3 Sub Image Part

The sub image part D30 includes a Start Of Image marker D31, display-image header D32, display-image data D33, and End Of Image marker D34.

The Start Of Image marker D31 is a marker indicating the beginning of the sub image part D30. A table for managing these markers is stored in the main header D22. This enables easily finding the sub image data, and enables easily finding where to split the file when dividing the file into separate images. Providing this marker also makes it unnecessary to add new SOI and EOI markers to new files when splitting the multiple image file D10 into the new files. As a result, the image files can be easily separated.

The display-image header D32 stores attribute information for the display-image data D33. This attribute information includes, for example, information identifying the display-image data D33 as the image data for display. The display-image data D33 is the image data generated for display on a display monitor such as a LCD, based on the main image data D23.

The End Of Image marker D34 is a marker indicating the end of the sub image part D30. A table for managing these markers is stored in the main header D22. This enables easily finding the sub image data, and enables easily finding where to split the file when dividing the file into separate images. Providing this marker also makes it unnecessary to add new SOI and EOI markers to new files when splitting the multiple image file D10 into the new files. As a result, the image files can be easily separated.

1-1-3-4 Image Information

Various types of information related to the image data is stored in the main header D22 and display-image header D32. Some of this image information is shown in FIG. 4.

FIG. 4A shows an example of the image information D26 stored in the main header D22. As image information, image information for the main image and image information for the display image are stored in the main header D22. When display-image data for a plurality of images is stored in the multiple image file D10, image information for each of the display images is stored in the main header D22.

The image information for the main image includes, for example, pixel count and rotation (orientation) information of image. In the example in FIG. 4A the pixel count is 1920 horizontal dots and 1440 vertical dots, and the image rotation is 90°.

Image information for the display image stored in the main header D22 includes, for example, starting address information, display image identifier, image type information, aspect ratio information, and rotation information. The starting address information indicates the start address of the sub image part D30. The display image identifier is an identifier indicating that the image data stored in the sub image part D30 is image data for displaying. The image type information identifies the type of image data stored in the sub image part D30. For example, it includes VGA, HDTV, or other type of image. The aspect ratio information identifies the aspect ratio of the image stored in the sub image part D30. The rotation information identifies the angle of rotation of the image data stored in the sub image part D30.

FIG. 4B shows an example of the image information stored in the display-image header D32. The image information stored in the display-image header D32 is image information related to the display-image data D33. The type (item) of image information stored in the display-image header D32 is the same as the type (item) of image information for the main image stored in the main header D22. More specifically, the display-image header D32 stores the pixel count and image rotation value.

The main header D22 thus stores image information for the main image (called "main image information" below) and image information for the display image (called "first display-image information" below) as shown in FIG. 4A, and the display-image header D32 stores image information for the display image (called "second display-image information" below) as shown in FIG. 4B. The items (types) of image information contained in the second display-image information stored in the display-image header D32, and the items (types) of image information contained in the main image information stored in the main header D22, are thus "pixel count" and "rotation information", and they are shared (see FIG. 4A and FIG. 4B). When splitting the main image part D20 and sub image part D30 into two image files, the image information format described above enables creating a new image file using the display-image data D33 as the main image data without greatly changing the information in the sub image part D30. This is because image information for the display-image data D33 is already stored in the display-image header D32 using the same format as the main image information. Note that the items of the image information stored in the main image information and the items of the image information stored in the second display-image information do not all need to match, and it is sufficient if only some of the items are in common.

The items of the image information contained in the first display-image information stored in the main header D22 include "start address" and "display image identifier" as shown in FIG. 4A, and thus differ from the items of the image information stored in the second display-image information. The main header D22 includes detailed image information necessary for managing the display-image data D33, as the first display-image information. This enables the controller 150 to easily manage the display-image data D33 by simply interpreting the image information D26 in the main header D22.

1-1-4 Relationship to the Invention

The CCD image sensor 141, A/D converter 105, and image processor 160 together render an example of the main image data acquisition means of the invention.

The setting means rendered by the pixel count setting menu screen M10 is an example of the setting means of the invention.

The configuration including the digital zoom processing unit 165 is an example of the display-image data generating means of the invention.

The controller 150 is an example of the image file generating means of the invention.

The digital camera 101 is an example of the image file generating means of the invention.

The communication unit 111 is an example of the communication means of the invention.

The communication unit 111 and controller 150 together render an example of the information acquisition means of the invention.

The aspect ratio conversion method selection menu M15 is an example of the generating method selection means of the invention.

The rotation detector 190 is an example of the rotation command receiving means of the invention.

The controller 150 is an example of an image file acquisition means of the invention.

The controller 150 is an example of an image file changing means of the invention.

The multiple image file D10 is an example of an image file of a first type according to the invention.

The single image file D40 is an example of an image file of a second type according to the invention.

The card slot 107, controller 150, and LCD monitor 110 together render an example of the reproduction means of the invention.

The controller 150 is an example of a sensing means of the invention.

The controller 150, image processor 160, and buffer memory 115 together render an example of an image file conversion means according to the invention.

The controller 150 and communication unit 111 together render an example of a transmission means according to the present invention.

The digital camera 101 is an example of an image file transmission means according to the present invention.

The memory card 108, internal memory 109, and buffer memory 115 are examples of storage means in the invention.

The controller 150 is an example of the extraction means of the invention.

The digital camera 101 is an example of an image data transmission device according to the present invention.

The communication unit 111 and controller 150 together render an example of a transmission command acquisition means according to the present invention.

1-2 Recording Operation

The image data recording operation of the digital camera 101 according to this first embodiment of the invention is described next. In this embodiment of the invention the image file stores image data for an HDTV display-image data for a WVGA display, and image data for a VGA display as the display-image data.

1-2-1 Flow of Recording Operation

Figure 5:
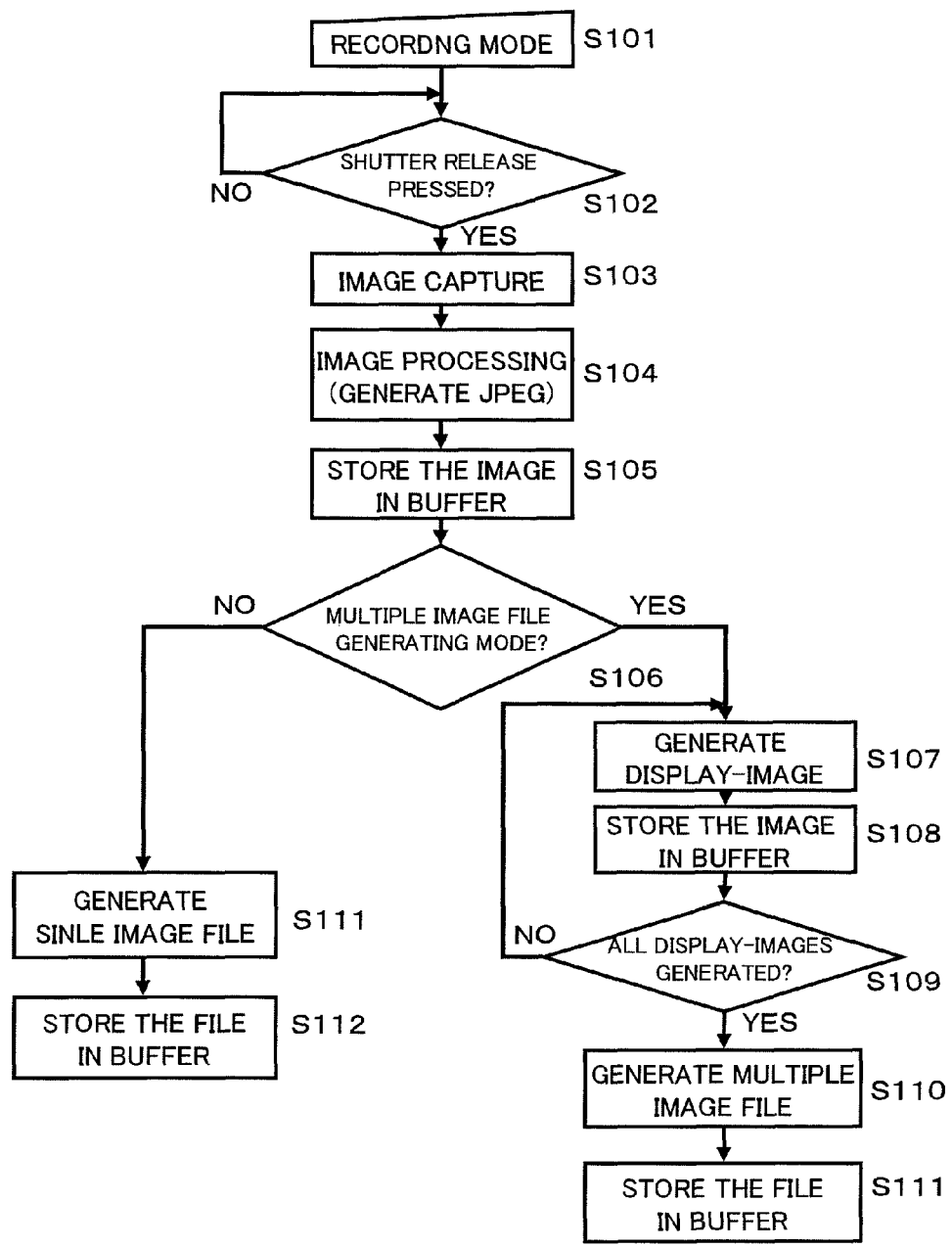
FIG. 5 is a flow chart of the recording operation of a digital camera according to a preferred embodiment of the present invention.

FIG. 5 is a flow chart of the recording operation of the digital camera 101.

The mode dial 174 is operated by the user, and the digital camera 101 is set to the recording mode (S101). When the recording mode is set, the controller 150 waits until the shutter release button 171 is depressed completely (S102). When the shutter release button 171 is depressed completely, the CCD image sensor 141 captures an image and generates the image data (S103). When the image data is generated, the image processor 160 applies a particular image processing operation, such as image compression, to the generated image data to generate JPEG image data (main image data) (S104).

When the JPEG image data is generated, the controller 150 stores the JPEG image data to the buffer memory 115 (S105).

Figure 6:
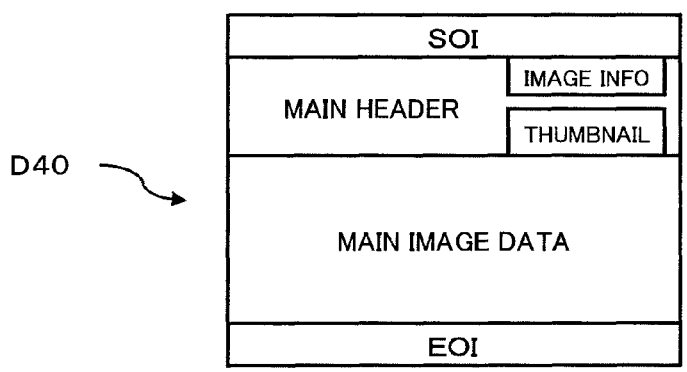
FIG. 6 shows the data structure of a single image file.

When the JPEG image data is stored in buffer memory 115, the controller 150 determines if the digital camera 101 is set to the multiple file generation mode (S106). This multiple file generation mode is the mode that generates an image file storing both main image data and display-image data (an image file such as the multiple image file D10 shown in FIG. 3). The single file generating mode is the mode that generates an image file storing only the main image data (an image file such as the single image file D40 shown in FIG. 6).

If the digital camera 101 is set to the single file generation mode instead of the multiple file generation mode, the controller 150 generates a single image file based on the JPEG image data stored in the buffer memory 115 (S111). When a single image file is generated, the controller 150 stores the generated single image file to the memory card 108 or internal memory 109 (S112).

If the digital camera 101 is set to the multiple file generation mode, the digital zoom processing unit 165 generates the display-image data by applying image processing, such as subsampling and interpolation, to the JPEG image data stored in the buffer memory 115 (S107). The display-image data is, for example, image data with the pixel count of an HDTV or VGA image. When the display-image data is generated, the controller 150 stores the display-image data in the buffer memory 115 (S108).

When the display-image data is stored in the buffer memory 115, the controller 150 determines if all of the previously set display-image data has been generated (S109).

If all pieces of display-image data have not been generated, the digital zoom processing unit 165 generates the display-image data that has not yet been generated (S107 to S108). For example, if two types of display-image data for HDTV and VGA images are to be created, the steps described above (S107-S108) repeat until the two types of display-image data are generated.

When it is determined that all pieces of display-image data have been generated, the controller 150 generates a multiple image file wrapping the image data stored in the buffer memory 115 and stores the multiple image file in a single file (S110). When the multiple image file is generated, the controller 150 stores the generated multiple image file to the memory card 108 or internal memory 109 (S111).

By thus having two operating modes, a multiple file generation mode and a single file generation mode and enabling the user to select which mode to use, the user can easily select the image file of the desired image file format.

Figure 7:
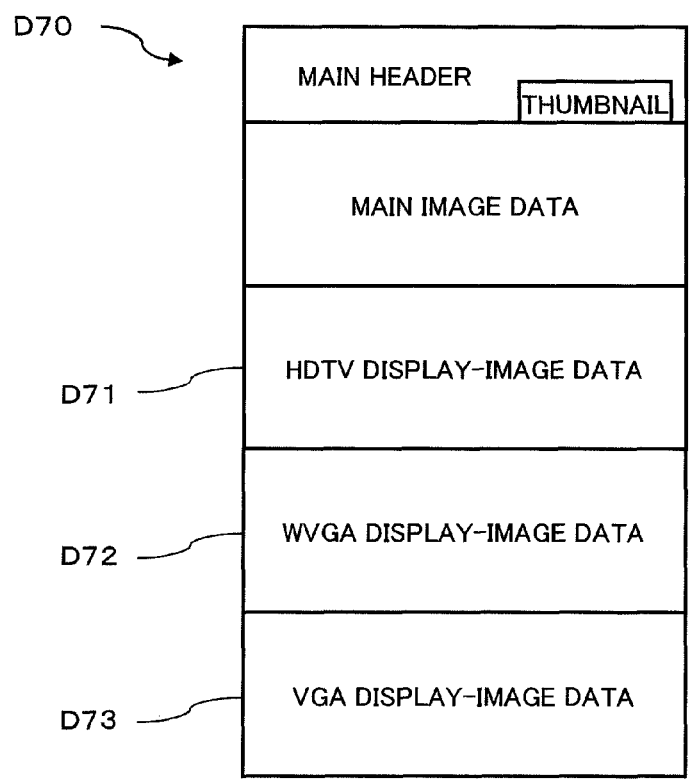
FIG. 7 shows the data structure of a multiple image file storing a plurality versions of display-image data.

In this embodiment of the invention, when the recording operation stops, the multiple image file D70 shown in FIG. 7 is generated. As shown in FIG. 7, the multiple image file D70 stores the display-image data ordered by the pixel count. Note, in FIG. 7, that the Start Of Image marker (SOI) and End Of Image marker (EOI) are not shown and the display-image header is also not shown.

By thus always ordering the display-image data by pixel count, finding the desired display-image data is easier.

This embodiment of the invention generates the display-image data after storing the main image data in the buffer memory 115. Alternatively, however, the main image data and display-image data may be generated simultaneously, and the image file may be generated after the generation of the main image data and display-image data is finished. This configuration enables simultaneously generation of the main image data and display-image data, and thus the image file can be quickly generated.

1-2-2 Recording in Continuous Shooting Mode

Figure 8:
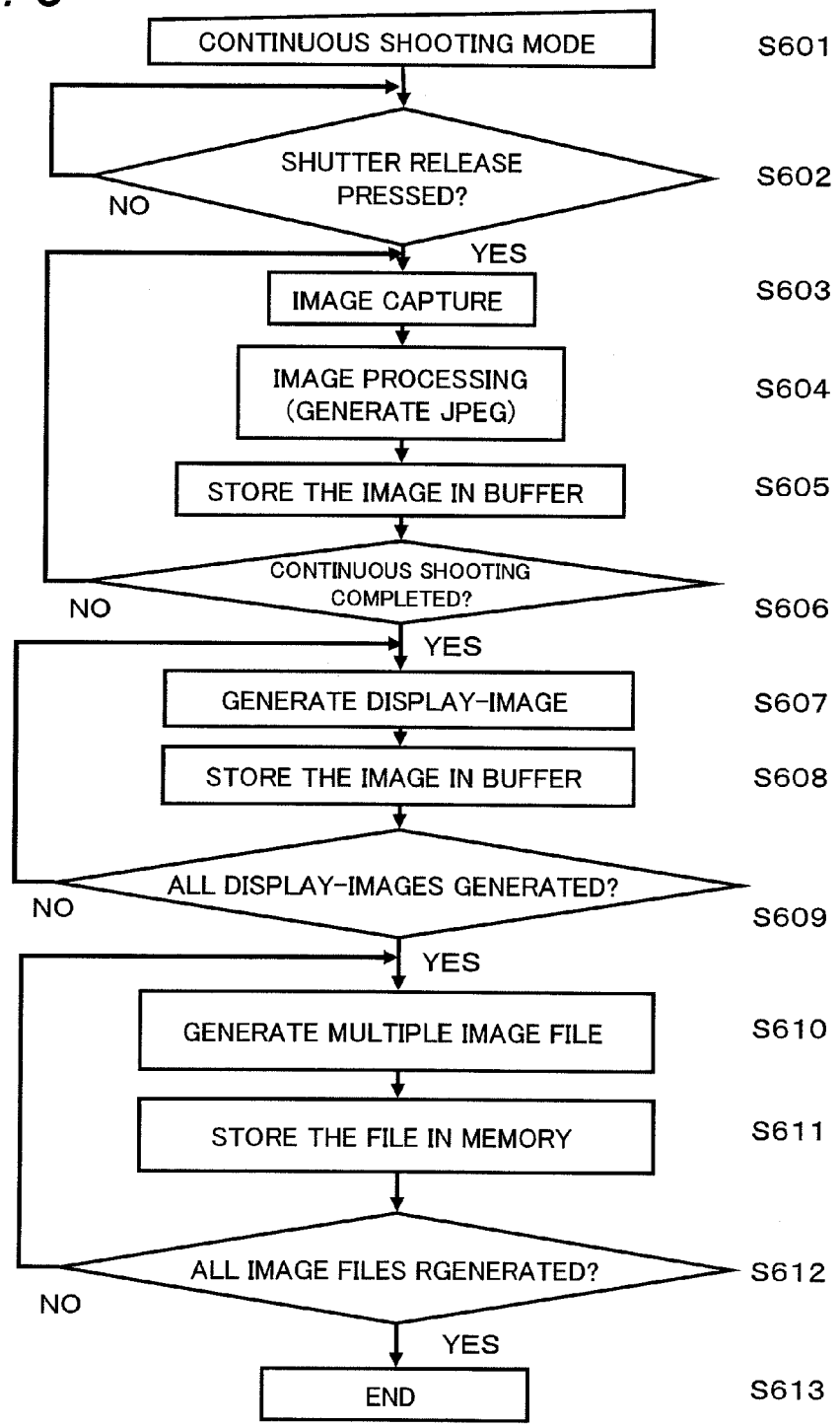
FIG. 8 is a flow chart describing the continuous shooting mode of a digital camera according to a preferred embodiment of the present invention.

FIG. 8 is a flow chart of the recording operation when the digital camera 101 is set to a recording mode for continuous shooting (referred to below as the continuous shooting mode). The user can set the digital camera 101 to the continuous shooting mode (S601). When the continuous shooting mode is set, the controller 150 waits until the shutter release button 171 is depressed completely (S602). When the shutter release button 171 is pressed, the CCD image sensor 141 captures an image (S603). When an image is captured, the image processor 160 processes the image and generates the JPEG image data (S604). When the JPEG image data is generated, the controller 150 stores the generated JPEG image data (main image data) in the buffer memory 115 (S605).

When the JPEG image data is stored in the buffer memory 115, the controller 150 determines if the continuous shooting mode that captures the predetermined number of pictures has ended (S606).

If the continuous shooting mode has not ended, the CCD image sensor 141 repeats the image capture operation and these steps (S603~S606) repeat.

If the continuous shooting mode has ended, the digital zoom processing unit 165 generates the display-image data based on the JPEG image data stored in the buffer memory 115 (S607). When the display-image data is generated, the controller 150 stores the generated display-image data to the buffer memory 115 (S608).

When the display-image data is stored to the buffer memory 115, the controller 150 determines if display-image data has been generated for all JPEG image data in the buffer memory 115 (S609).

If all pieces of display-image data have not been generated, the digital zoom processing unit 165 generates display-image data again and repeats steps (S607~S608).

When it is determined that all pieces of display-image data have been generated, the controller 150 creates an image file containing the main image data stored in the buffer memory 115 and the corresponding display-image data (S610). When the image file is generated, the controller 150 stores the resulting image file to the memory card 108 or internal memory 109 (S611).

When the image file is stored to the memory card 108 or internal memory 109, the controller 150 determines if all image files have been generated (S612).

If all image files have not been generated, the controller 150 generates the image file again (S610-S611). However, if all image files have been generated, the controller 150 stops recording in the continuous shooting mode of the digital camera 101 (S613).

By thus first capturing all of the main image data and then generating the display-image data, the digital camera 101 can dedicate the processor power of the controller 150 to capturing the main image data when capturing the main image data in the continuous shooting mode. As a result, processor power consumed by processes other than the capturing images can be reduced when operating in the continuous shooting mode, and continuous shooting can be taken at high speed.

This embodiment of the invention generates the display-image data after first capturing all of the main image data, but the main image data and display-image data may be generated simultaneously, and the image files may be generated sequentially and stored to the memory card 108 or internal memory 109. This greatly reduces the amount of image data temporarily stored to the buffer memory 115. The storage capacity of the buffer memory 115 can therefore be reduced greatly and the cost of the digital camera 101 can be reduced.

Further alternatively, the main image data and the display-image data may both be generated when the image is captured, temporarily stored in the buffer memory 115. After continuous shooting is completed, the main image data and display-image data stored in the buffer memory 115 may be combined into a single image file, and the image file then may be stored to the memory card 108. With this method it also omits generating the image file while capturing in the continuous shooting mode, and thus a high speed continuous shooting mode is also possible. Further the display-image data can be generated while capturing the main image data, and thus the display-image data can also be generated relatively easily.

Further alternatively, the main image data may be generated during image capture and temporarily stored to the buffer memory 115. After continuous shooting is completed, the main image data stored in the buffer memory 115 then may be read, the display-image data and image file may be generated, and the resulting image file may be stored to the memory card 108. This method also eliminates the process of creating the image file while imaging in the continuous shooting mode, and thus enables high speed continuous shooting.

1-2-3 Various Settings for Recording

Various settings in the digital camera 101 for recording image data are described next. The settings set in this example include the pixel count of the display-image data and the aspect ratio of the display-image data.

1-2-3-1 Setting for Pixel Count of the Display-Image Data

Figure 9:
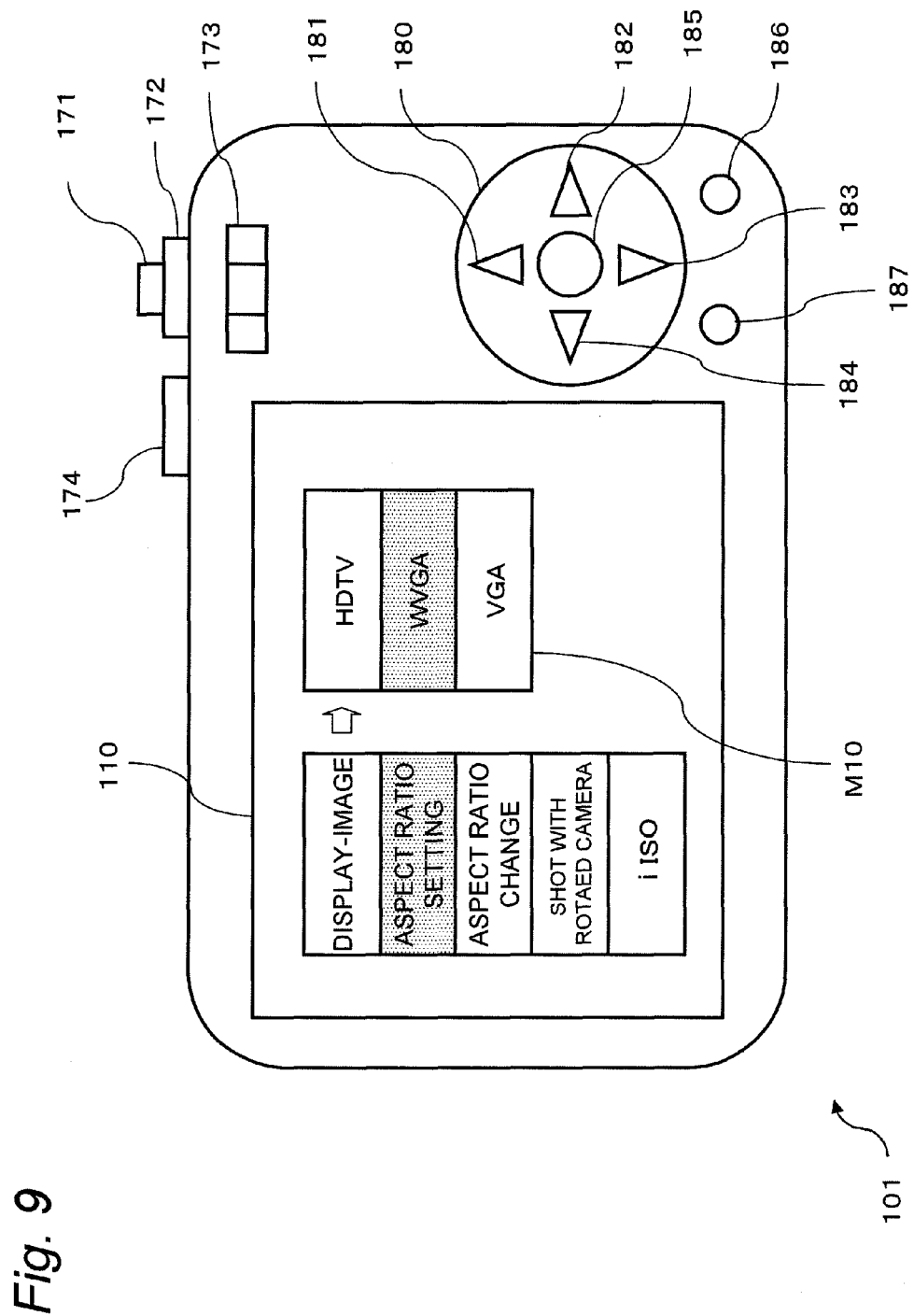
FIG. 9 shows an example of a menu for setting the pixel count of the display-image data.
Figure 10:
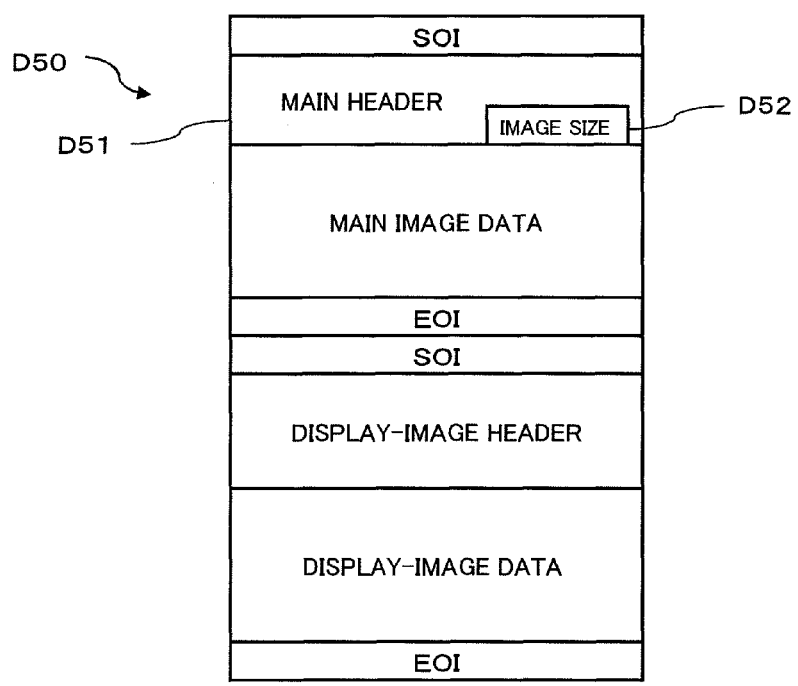
FIG. 10 shows the data structure of the multiple image file.

With reference to FIG. 9 and FIG. 10, setting for the pixel count of the display image in the digital camera 101 according to this embodiment of the invention is described next. FIG. 9 shows an example of the display screen used for setting type of the display-image data. FIG. 10 is a schematic diagram of the image file generated when the image data is captured with the display image size set.

The user can preset the pixel count of the display-image data to be reproduced. The user sets the pixel count of the display-image data in a menu such as the pixel count setting menu screen M10 shown in FIG. 9. In this example, the user sets the pixel count by selecting one of pixel counts such as VGA (640 horizontal pixels by 480 vertical pixels), and HDTV (1088 horizontal pixels by 612 vertical pixels). More specifically, the pixel count of the display-image data can be set using the LCD monitor 110 and operating unit 170. In this case, the LCD monitor 110, controller 150, and operating unit 170 render the setting means of the invention.

When the image is captured with pixel count of the display-image data being set, the controller 150 generates an image file based on the main image data and the display-image data which has the predetermined pixel count and is generated based on the captured main image data. For example, a multiple image file D50 such as shown in FIG. 10 is generated. The multiple image file D50 stores the display-image data in an area other than the header. The controller 150 then stores the resulting image file in the memory card 108 or internal memory 109.

The pixel count of the display-image data to be stored in the multiple image file D50 can thus be set by user operation. As a result, the controller 150 can generate a multiple image file D50 storing display-image data of the size desired by the user. For example, the user can select the pixel count of the display-image data in order to generate display-image data matching the pixel count of the display device which the user uses most frequently.

In addition, the main header D51 shown in FIG. 10 stores the image size information D52. The image size information D52 is information indicating the pixel count of the display-image data. More specifically, the main header D51 stores information relating to the display-image data. This enables the controller 150 to confirm the pixel count of the display-image data by simply reading the main header D51.

The pixel count of the display-image data can be set automatically instead of by the user as described above. This saves the time and effort of setting the pixel count, and improves user convenience. For example, the pixel count may be automatically set according to the external device to which the digital camera 101 was last connected. More specifically, information about the pixel count may be acquired through a communications means from the last connected image display device, and the display-image data may be generated using the pixel count indicated by this information. In other words, the digital camera 101 may set the pixel count of the display-image data according to the pixel count information acquired from the image display device.

The type of output image data output from the digital camera 101 may be selected by the user, and the pixel count of the display-image data may be set automatically based on this selection. For example, if the user sets HDTV as the type of output image data, the controller 150 sets HDTV as the pixel count of the display-image data to be stored in the multiple image file D50.

The main header D51 may also store image data of smaller size than the display-image data described above. Image data of such a small size can be image data which is generally called "thumbnail image".

1-2-3-2 Setting for Aspect Ratio of the Display-Image Data

Figure 11:
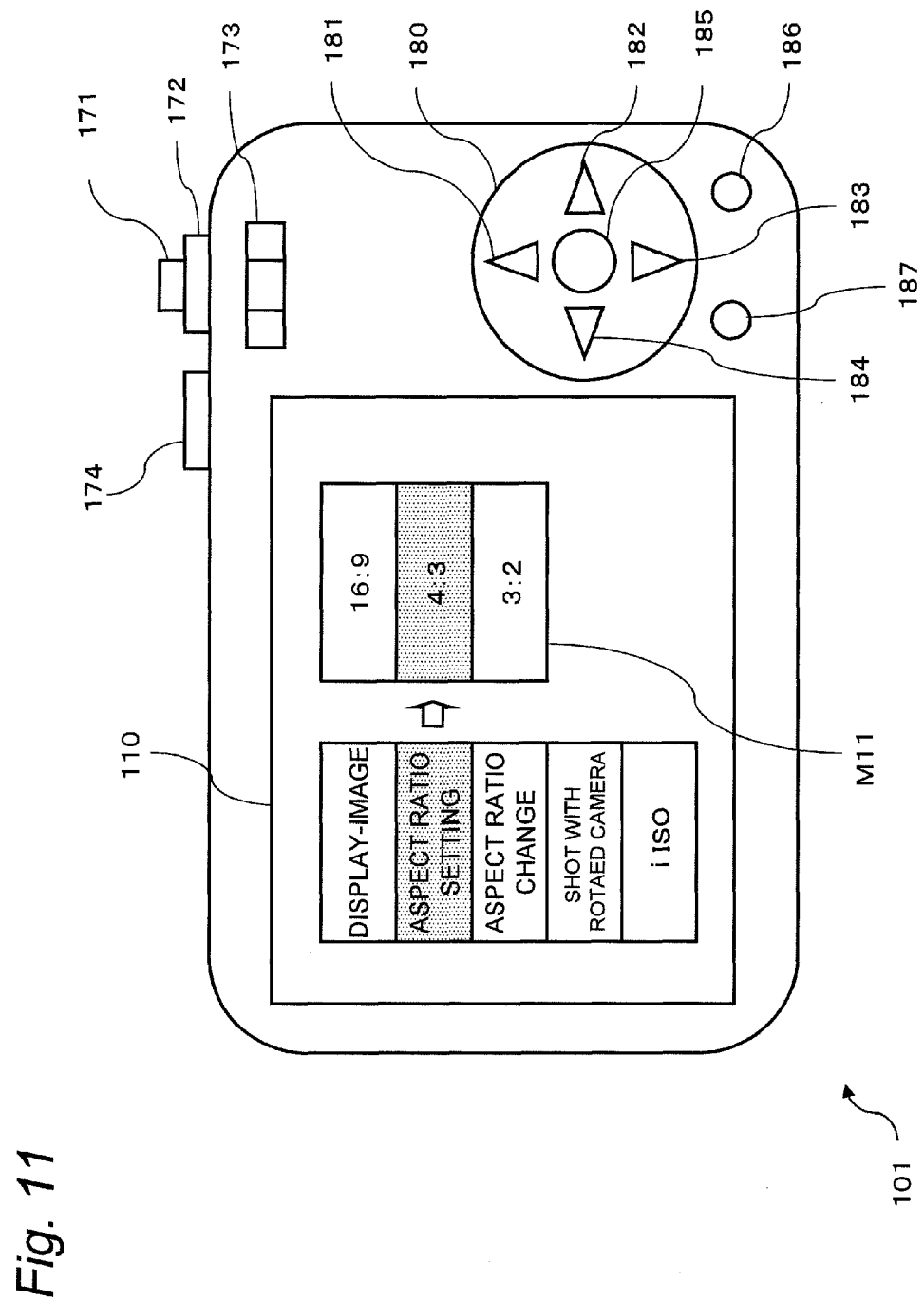
FIG. 11 shows an example of a menu for setting the aspect ratio of the display-image data.
Figure 12:
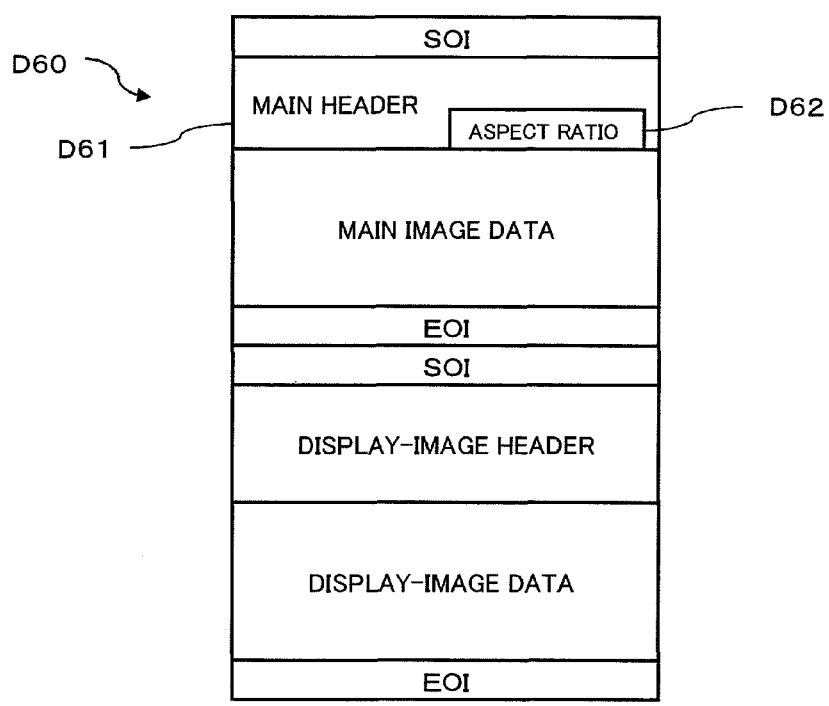
FIG. 12 shows the data structure of the multiple image file.

With reference to FIG. 11 and FIG. 12, setting an aspect ratio of the display-image data in the digital camera 101 according to this embodiment of the invention is described next. FIG. 11 shows the display screen used to select the aspect ratio of the display-image data. FIG. 12 schematically shows an image file generated when the image data is captured after setting the aspect ratio.

The user can preset the aspect ratio of the image data to be recorded. The user sets the aspect ratio of the image data to be recorded using a menu such as shown in the aspect ratio setting menu screen M11 shown in FIG. 11. In this example, the user selects one aspect ratio from among a group of aspect ratios such as 16:9 and 4:3.

When capturing the image proceeds with the aspect ratio being set, the controller 150 generates an image file from the captured main image data and the display-image data which has the preset aspect ratio and is generated based on the main image data. This results in a multiple image file D60 as shown in FIG. 12, for example. The controller 150 then stores the generated image file to the memory card 108 or internal memory 109.

The aspect ratio of the display-image data to be stored in the multiple image file D60 can thus be selected by the user. As a result, the controller 150 can generate a multiple image file D60 storing display-image data with the aspect ratio desired by the user. The user may, for example, select the aspect ratio of the display-image data to generate display-image data matching the aspect ratio of the display device which is used most frequently by the user.

The main header D61 shown in FIG. 12 also stores the image size information D62. The image size information D62 is information indicating the aspect ratio of the display-image data. The main header D61 thus stores information related to the display-image data.

With this arrangement, the controller 150 can confirm the aspect ratio of the display-image data by simply referencing the main header D61.

The aspect ratio of the main image data and the aspect ratio of the display-image data may be set separately. This enables generating display-image data with a different aspect ratio than the aspect ratio of the main image data. For example, the case is considered, in which the image display device is a television. The aspect ratio of the CCD used in the digital camera is typically 4:3 while the aspect ratio of the television is 16:9. Thus, setting the aspect ratio of the main image data to 4:3 and the aspect ratio of the display-image data to 16:9 allows image data best suited to each application to be achieved.

1-2-3-3 Generating Method of Display-Image Data with Different Aspect Ratio

Figure 13:
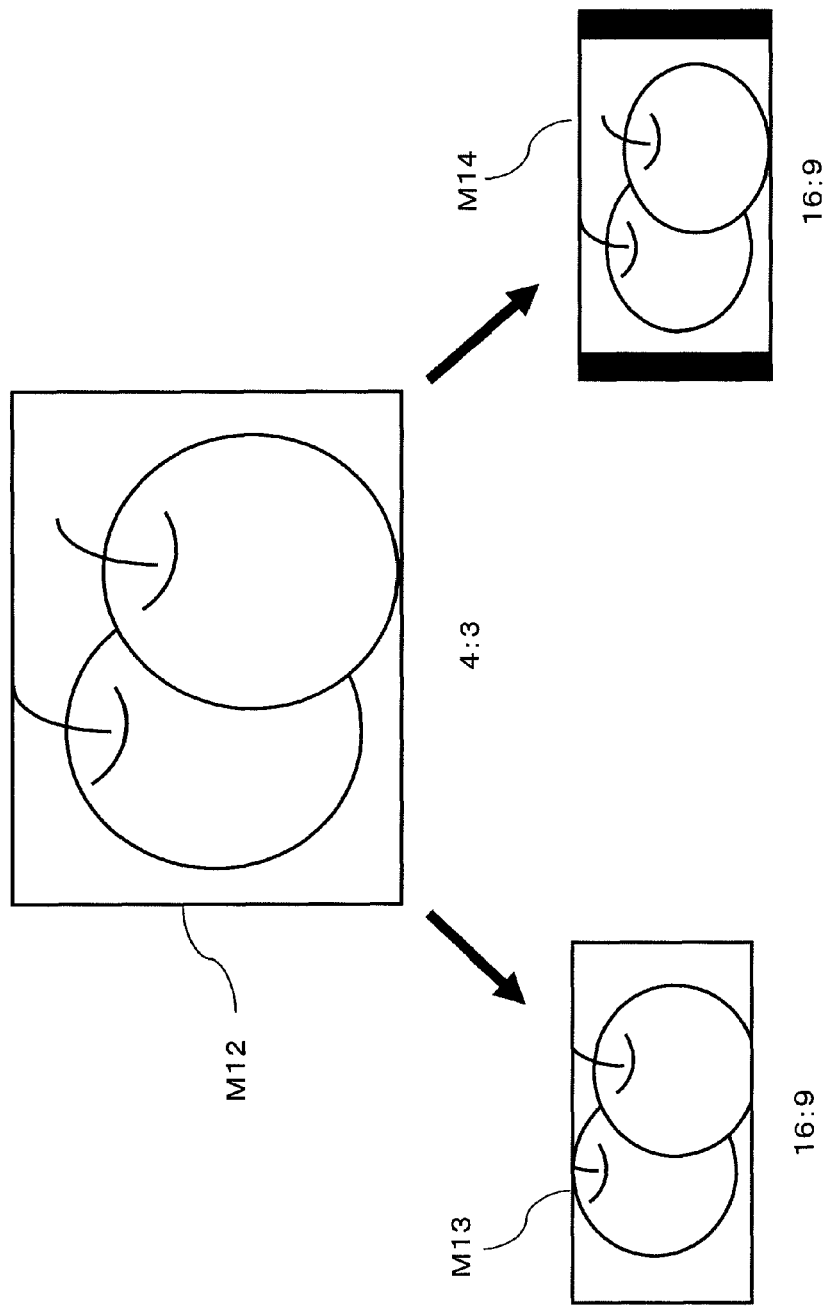
FIG. 13 describes a method of generating display-image data with a different aspect ratio than the main image.
Figure 14:
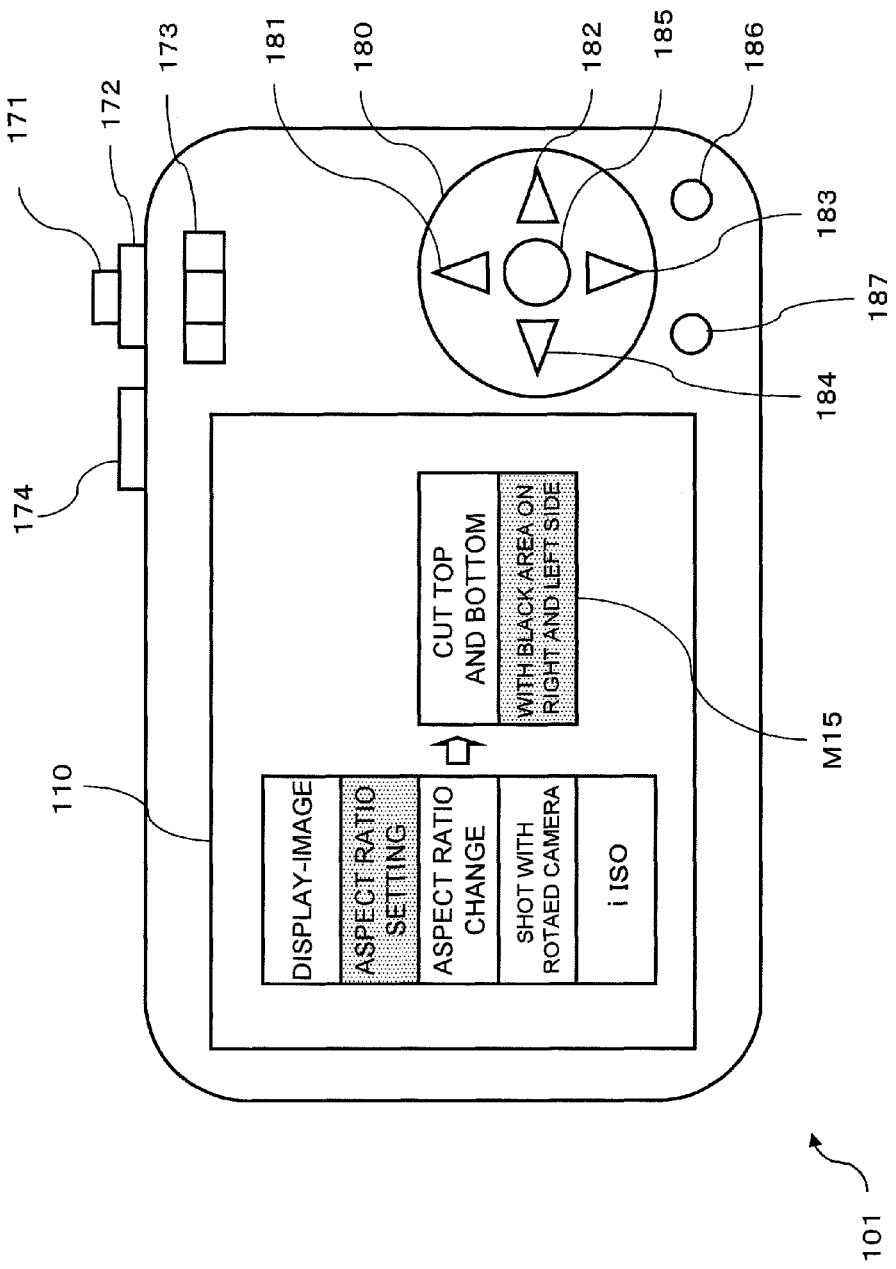
FIG. 14 shows an example of a menu for setting the method of converting the aspect ratio of the display-image data.

With reference to FIG. 13 and FIG. 14, a method of generating display-image data (16:9) with a different aspect ratio than the aspect ratio (4:3) of the main image data in a digital camera 101 according to this embodiment of the invention is described next. FIG. 13 is a schematic diagram showing the image of the main image data (aspect ratio of 4:3) and an image of the display-image data (aspect ratio of 16:9). In FIG. 13 image data M12 is the main image data with an aspect ratio of 4:3. Image data M13 with the top and bottom cropped and image data M14 with added black bars on the right and left sides are image data having the aspect ratio of 16:9. FIG. 14 shows an example of a menu for setting a method to convert the main image data with an aspect ratio of 4:3 to the display-image data with an aspect ratio of 16:9.

The digital camera 101 can select multiple different methods to convert the main image data to display-image data with a different aspect ratio than the main image data. Two methods of generating display-image data with an aspect ratio of 16:9 from main image data with an aspect ratio of 4:3 are described below.

The first method includes cropping the top and bottom of the main image data with an aspect ratio of 4:3 to generate the display-image data with an aspect ratio of 16:9. By using this method, the controller 150 can produce display-image data M13 with the top and bottom cut off from the main image data M12 with an aspect ratio of 4:3 (see FIG. 13). More specifically, the digital zoom processing unit 165 applies an image process, such as cropping, subsampling, or interpolation, to the main image data or the image data that is the source of the main image data so as to generate the display-image data M13 with the cropped top and bottom.

The second method includes reducing the image size of the main image data with an aspect ratio of 4:3 and inserting black bars in the areas where there is no data to generate the display-image data with an aspect ratio of 16:9. This method can create the display-image data M14 with black bars on the right and left sides from the main image data M12 (see FIG. 13). More specifically, the digital zoom processing unit 165 applies an image process such as cropping, subsampling, or interpolation, to the main image data or the image data that is the source of the main image data so as to generate the display-image data M14 with the black bars on the right and left sides.

In this embodiment of the invention the user can select either one of the two methods of generating the display-image data. The digital camera 101 thus has a plurality of display-image data generating methods, and has a generating method selection means for setting which of the plural methods is used to generate the display-image data. For example, in an aspect ratio conversion method selection menu M15 such as shown in FIG. 14, the user can set the method for converting the aspect ratio when generating the display-image data from the main image data. By thus enabling the user to select the aspect ratio conversion method, the user can get display-image data as desired.

In addition, by combining a valid image area and a no-image-signal area to generate the display-image data, the display-image data with an aspect ratio different from the aspect ratio of the main image data can be generated. The display-image data with black bars as described above is one example of this method. A display image with a different aspect ratio than the main image can also be generated by inserting black bars at the top and bottom or by inserting blue bars on the right and left sides. When the display-image data is generated by thus combining a valid image area and a no-image-signal area, specific information for identifying the valid image area is preferably stored in the main header and/or the display-image header. This provides compatibility with processes, such as printing, that use only the data in the valid image area.

1-2-3-4 Recording with the Rotated Camera

Figure 15:
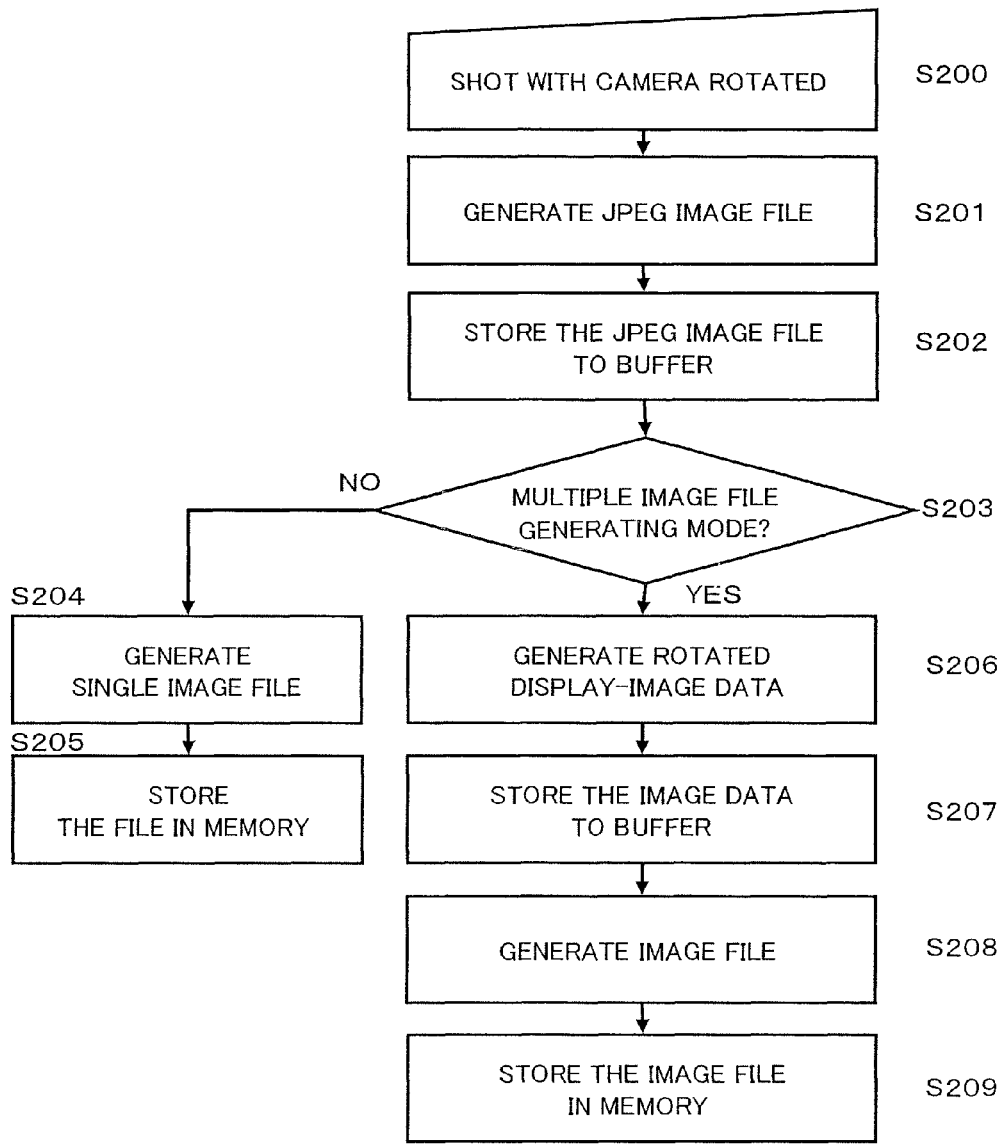
FIG. 15 is a flow chart of the recording operation according to a preferred embodiment of the present invention when the digital camera is rotated when taking a picture.

With reference to FIG. 15, recording operation when the digital camera 101 which is rotated in this embodiment of the invention is described next. FIG. 15 is a flow chart of the recording operation when the digital camera 101 is rotated.

The user can take a picture of a subject with the digital camera 101 rotated (S200). In this case, the rotation detector 190 detects the angle of rotation of digital camera 101, and the controller 150 can acquire the rotation information from the rotation detector 190 and determine based on the rotation information if the digital camera is rotated.

After an image of the subject is captured, the image processor 160 processes the image data to generate JPEG image data (S201). When the JPEG image data is generated, the controller 150 stores the resulting JPEG image data to the buffer memory 115 (S202).

The controller 150 then determines if the digital camera 101 is set to the multiple image file generation mode (S203).

If it is determined that the single image file generation mode is set, the controller 150 stores the rotation information acquired from the rotation detector 190 in the header, and reads the image data stored in the buffer memory 115 to generates an image file (single image file) (S204). The controller 150 then stores the generated image file in the memory card 108 or internal memory 109 (S205). The display-image data is not generated at this time.

On the other hand, if it is determined that the multiple image file generation mode is set, the digital zoom processing unit 165 generates the display-image data based on the main image data stored in the buffer memory 115 (S206). The display-image data generated at this time is rotated. More specifically, the digital zoom processing unit 165 applies an image reduction process and a rotation process to the main image data to generate the display-image data. This rotation process is a pixel position conversion process that converts horizontal pixel rows in the display-image data to vertical pixel rows. The digital zoom processing unit 165 may also change the pixel count of the display-image data after it is rotated according to the angle of rotation indicated by the rotation information. More specifically, when the rotation process converts landscape mode display-image data to portrait-oriented display-image data, the digital zoom processing unit 165 may change the pixel count of the display-image data after rotation so that the vertical pixel count of the display-image data after rotation is equal to the horizontal pixel count of the display-image data before rotation.

After the display-image data is generated, the controller 150 stores the generated display-image data in the buffer memory 115 (S207). At this time, rotation information indicating that the generated display-image data is captured with the rotated digital camera 101 is also stored in the buffer memory 115 (S207). The controller 150 then generates an image file (multiple image file) from the main image data stored in buffer memory 115, the display-image data after rotation processing, the main image data rotation information, and the display-image data rotation information (S208). The controller 150 then stores the generated image file in the memory card 108 or internal memory 109 (S209).

Figure 16:
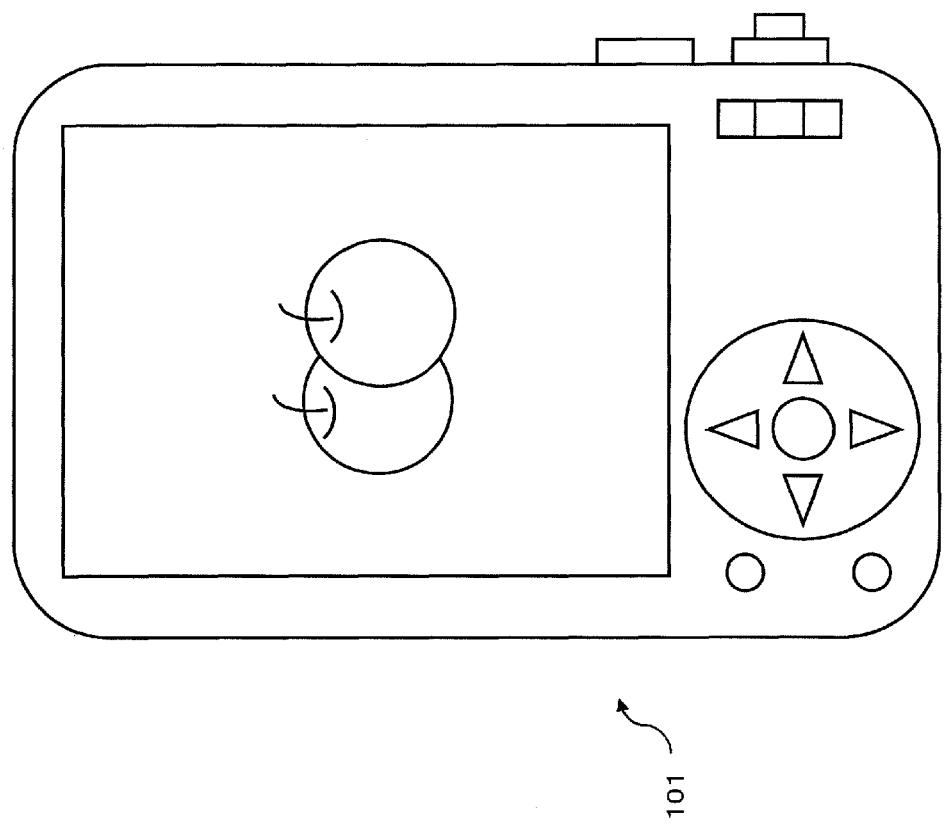
FIG. 16 shows the display-image data displayed on the LCD monitor before image rotation.
Figure 17:
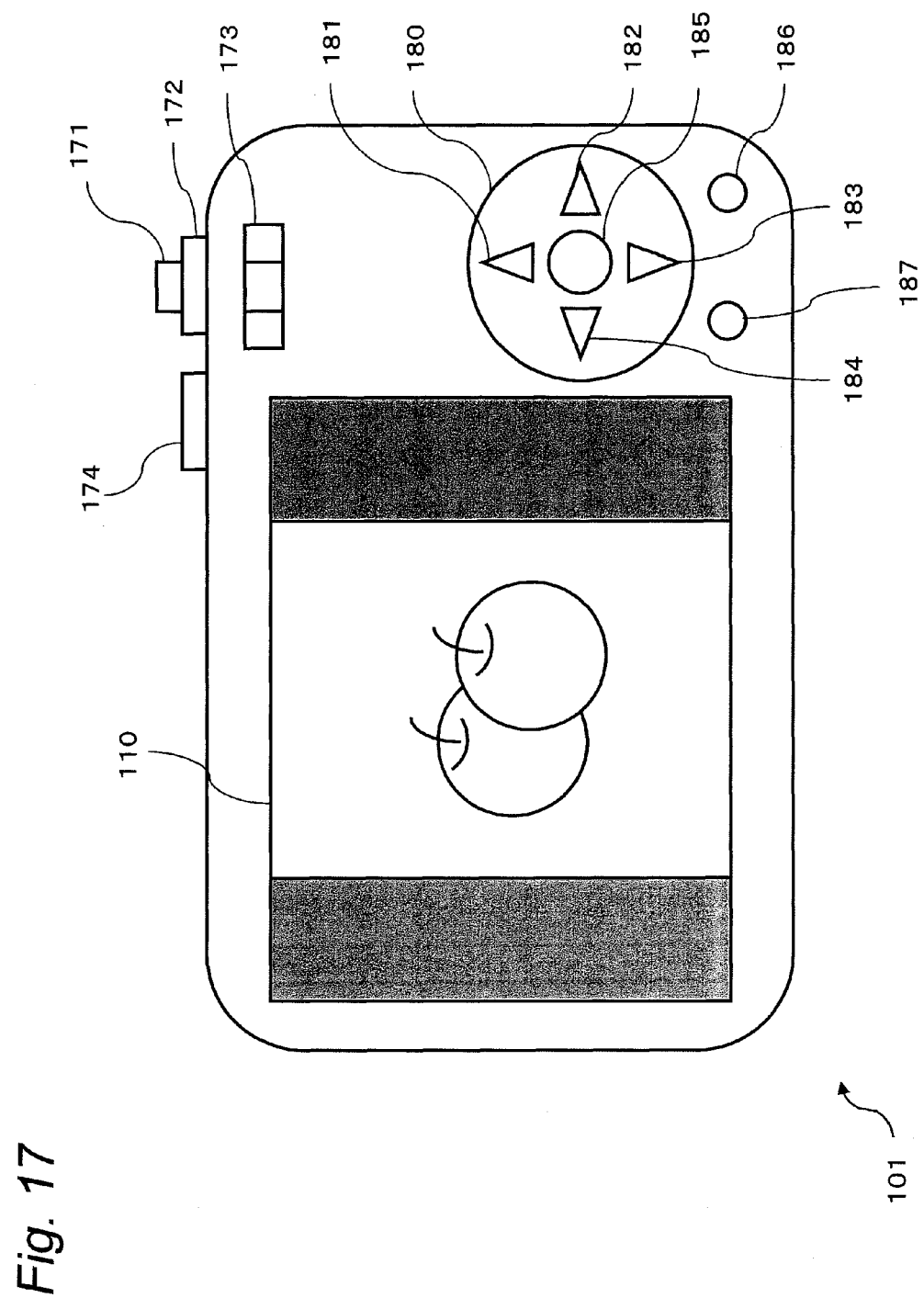
FIG. 17 shows the display-image data displayed on the LCD monitor after image rotation.

For example, in a case that a picture is taken with the digital camera 101 rotated 90 degrees to the right, the image is displayed on the LCD monitor 110 as shown in FIG. 16 when the captured image is reproduced as usual. However, when the display-image data stored in the image file generated according to the procedure shown in the flow chart of FIG. 15 is reproduced, the image data is displayed on the LCD monitor 110 after the rotation process as shown in FIG. 17.

If the image file does not contain display-image data, the controller 150 can display the image data after rotation by referring to the rotation information in the main header during reproduction of the main image data. More specifically, the rotated image data can be reproduced by referencing the rotation information (information relating to the direction of rotation and the angle of rotation) that is stored in the main header of the image file, during reproduction of the image.

As described above, the digital camera 101 according to this embodiment of the invention has a configuration including a CCD image sensor 141 for capturing main image data, an A/D converter 105, and an image processor 160. The digital camera 101 also has a rotation detector 190, digital zoom processing unit 165, and controller 150. The rotation detector 190 detects rotation of the digital camera 101. The digital zoom processing unit 165 generates rotated image data by applying a predetermined process including a rotation conversion to the main image data or the image data as the source image of the main image data according to the detection result (rotation information) from the rotation detector 190. The controller 150 then generates an image file containing the resulting display-image data. The generated image file includes a header storing the rotation information, the unrotated main image data, and the display-image data after rotation, and stores the display-image data in the other area than the header. Because the display-image data is thus stored in the image file after being rotated, it is not necessary to apply the rotation process to the display-image data when reproducing the display-image data, and the display-image data can be quickly reproduced.

The digital zoom processing unit 165 may also change the pixel count of the display-image data after rotation according to the angle of rotation. This enables sizing the display-image data to the display when the display-image data is generated. More specifically, the pixel count of the display-image data after rotation is preferably changed so that the vertical pixel count of the portrait-oriented display-image data is equal to the vertical pixel count of the landscape-oriented display-image data. This allows a portrait-oriented image to size to fit in the display screen, and thus it is not necessary to change the pixel count when reproduction of the portrait-oriented display-image data.

In addition, in this embodiment of the invention, when data for plural display images is stored for the main image data and if the image is taken with the digital camera 101 rotated, all display-image data is rotated and stored. For example, the case is considered, in which the display-image data for displaying on a TV and the display-image data for displaying on the LCD monitor of a digital camera are stored as the display-image data for the main image data. Both the display-image data for displaying on a TV and the display-image data for displaying on the LCD monitor of a digital camera are rotated when the image is captured with the digital camera 101 rotated.

In this manner, when the main image data is rotated, all pieces of display-image data generated therefrom are thus also rotated. This prevents the orientation of one version of the display-image data from differing from the orientation of other versions of the display-image data. As a result, the user can rotate the image data without considering the type of image data (that is, main image data, display-image data for a TV, display-image data for the monitor of a digital camera, or the like).

This embodiment of the invention also enables generating both display-image data that is not rotated and display-image data that is rotated, when a picture is taken with the digital camera 101 rotated. An image file can be generated from the main image data, display-image data that is not rotated, and display-image data that is rotated. This enables rapidly viewing the display-image data which is not rotated and the display-image data which is rotated.

Figure 18:
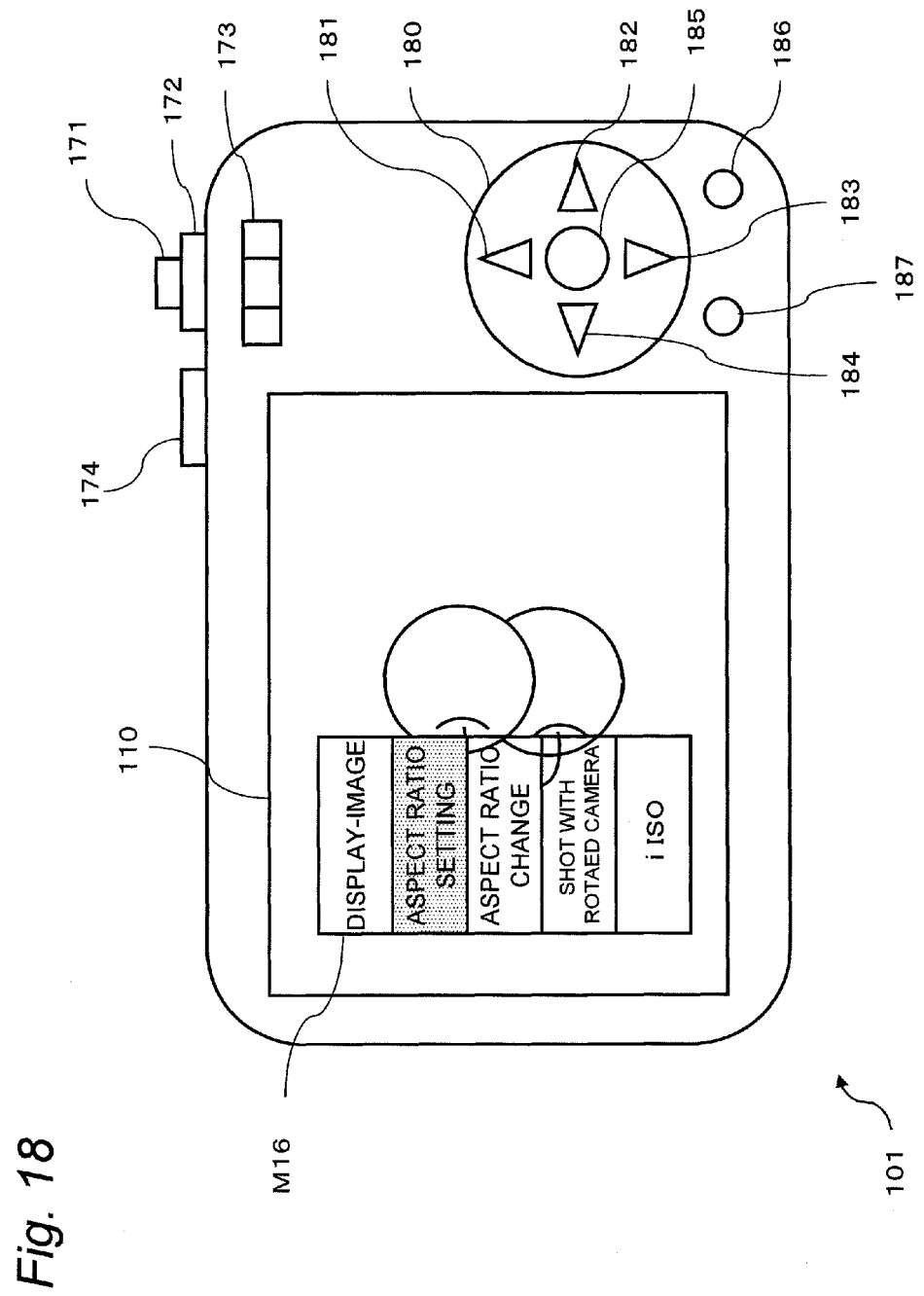
FIG. 18 shows an example of a menu for rotating the display-image data.

This embodiment of the invention generates the rotated display-image data when the picture is taken, but the rotated display-image data may be generated when the image is reproduced. In this case, while the display-image data is read from the image file stored in the memory card 108 or internal memory 109 and displayed on the LCD monitor 110, the controller 150 reads the main image data from the image file stored in the memory card 108 or internal memory 109 and generates the rotated display-image data when receiving a command for recording with rotation from the operating unit 170. For example, a setting menu (rotation record setting menu) M16 enabling the user to generate the rotated display-image data may be provided as shown in FIG. 18. This menu is displayed by operating the mode dial 174. When the user selects the rotation record setting menu M16, the operating unit 170 sends a control signal (rotation command) to the image processor 160. The digital zoom processing unit 165 receives this control signal (rotation command), generates the rotated display-image data according to the method described above, and stores the resulting display-image data in the image file in place of or in addition to the existing unrotated display-image data.

The controller 150 can thus acquire an image file that has a header, main image data, and display-image data, and stores the display-image data in an area other than the header. When receiving a rotate command, the image processor 160 may generate display-image data that is rotated according to the rotate command. The controller 150 then may store rotation information denoted by the rotate command in the header, and may store the rotated display-image data in the image file instead of or in addition to the unrotated display-image data.

The reproduction process of the rotated display-image data can thus be simplified even after the image file is generated, by thus rotating the display-image data and storing the rotated display-image data in the image file.

Degradation of the rotated display-image data can also be prevented by generating the rotated display-image data based on the main image data or the source image data of the main image data.

Note that the rotated display-image data may alternatively be generated based on the display-image data before rotation. In this case, the rotated display-image data can be easily generated by converting the horizontal and vertical pixel arrays. However, repeating the rotation process may also result in degraded display-image data after rotation. It is therefore preferable to generate the rotated display-image data based on the main image data because this can prevent degradation of the display-image data after rotation.

1-3 Reproduction Operation

The reproduction operation of image data by the digital camera 101 according to this embodiment of the invention is described next.

1-3-1 Flow of Reproduction Operation

Figure 19:
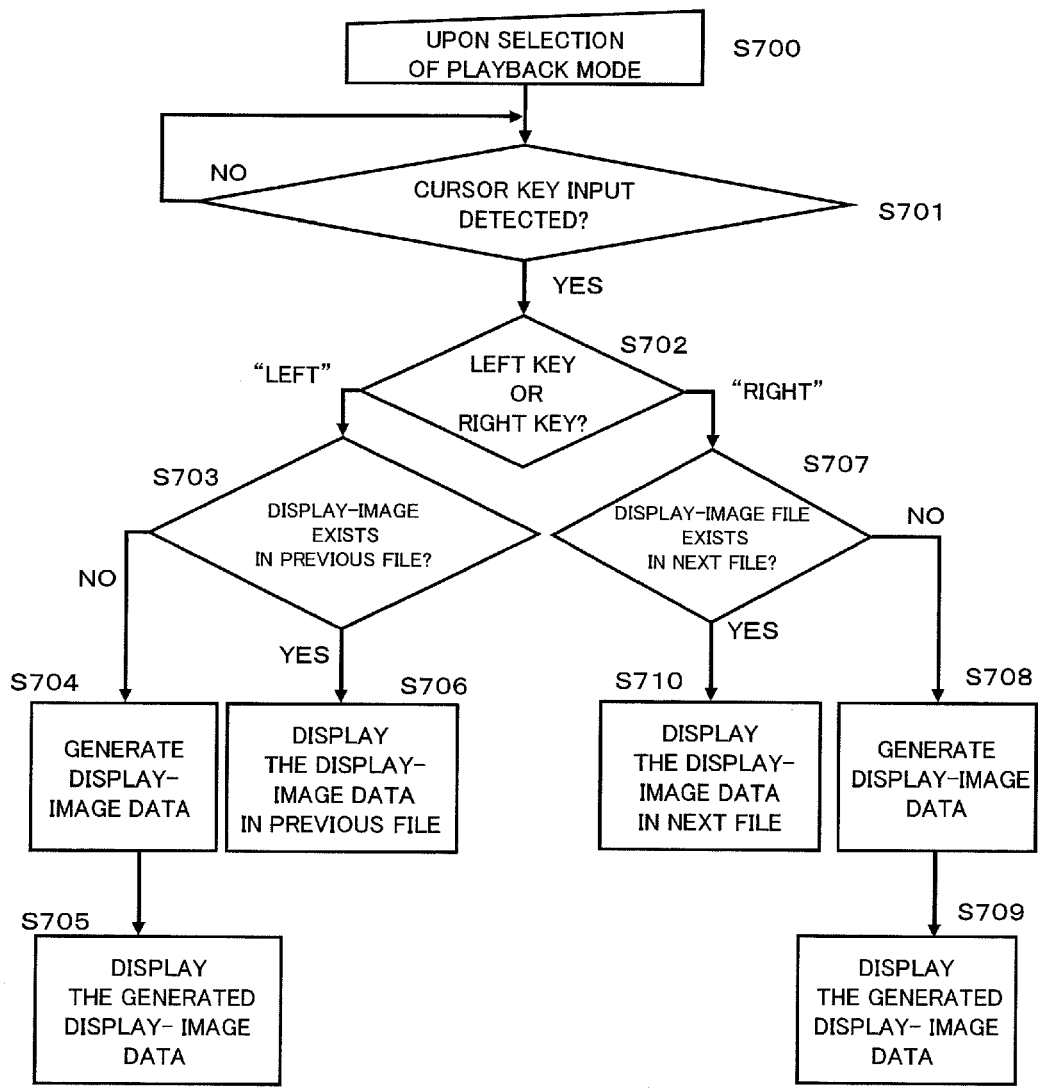
FIG. 19 is a flow chart of the reproduction process of a digital camera according to a preferred embodiment of the present invention.

FIG. 19 is a flow chart of the reproduction operation of the digital camera 101. User's operation with the mode dial 174 sets the digital camera 101 to the reproduction mode (S700). When the reproduction mode is set, the LCD monitor 110 displays the image data which was reproduced last. When the image data is displayed, the controller 150 waits for input from the cursor key 180 (S701).

When input from the cursor key 180 is detected, the controller 150 determines whether the input key is the left key 184 or the right key 182 (S702).

If the input key is the left key 184, the controller 150 determines if display-image data matching the pixel count of the LCD monitor 110 displaying the image data is stored in the image file located before the image file storing the currently displayed image data (S703).

If such display-image data is not found, the digital zoom processing unit 165 generates display-image data based on the main image data (S704). The LCD monitor 110 then displays the generated display-image data (S705). If such display-image data is found, the LCD monitor 110 displays the display-image data (S706).

If the input key is the right key 182, the controller 150 determines if display-image data matching the pixel count of the LCD monitor 110 displaying the image data is stored in the image file located after the image file storing the currently displayed image data (S707).

If such display-image data is not found, the digital zoom processing unit 165 generates display-image data based on the main image data (S708). The LCD monitor 110 then displays the generated display-image data (S709). If such display-image data is found, the LCD monitor 110 displays the display-image data (S710).

Reproduction of the display-image data on the LCD monitor 110 of the digital camera 101 is described above, but the display-image data may also be displayed on an image display device externally connected to the digital camera 101, such as a television. In this case the controller 150 determines if there is display-image data matching the pixel count of the image display device in step S703 and S707.

1-3-2 Accelerating the Reproduction Process

Figure 20:
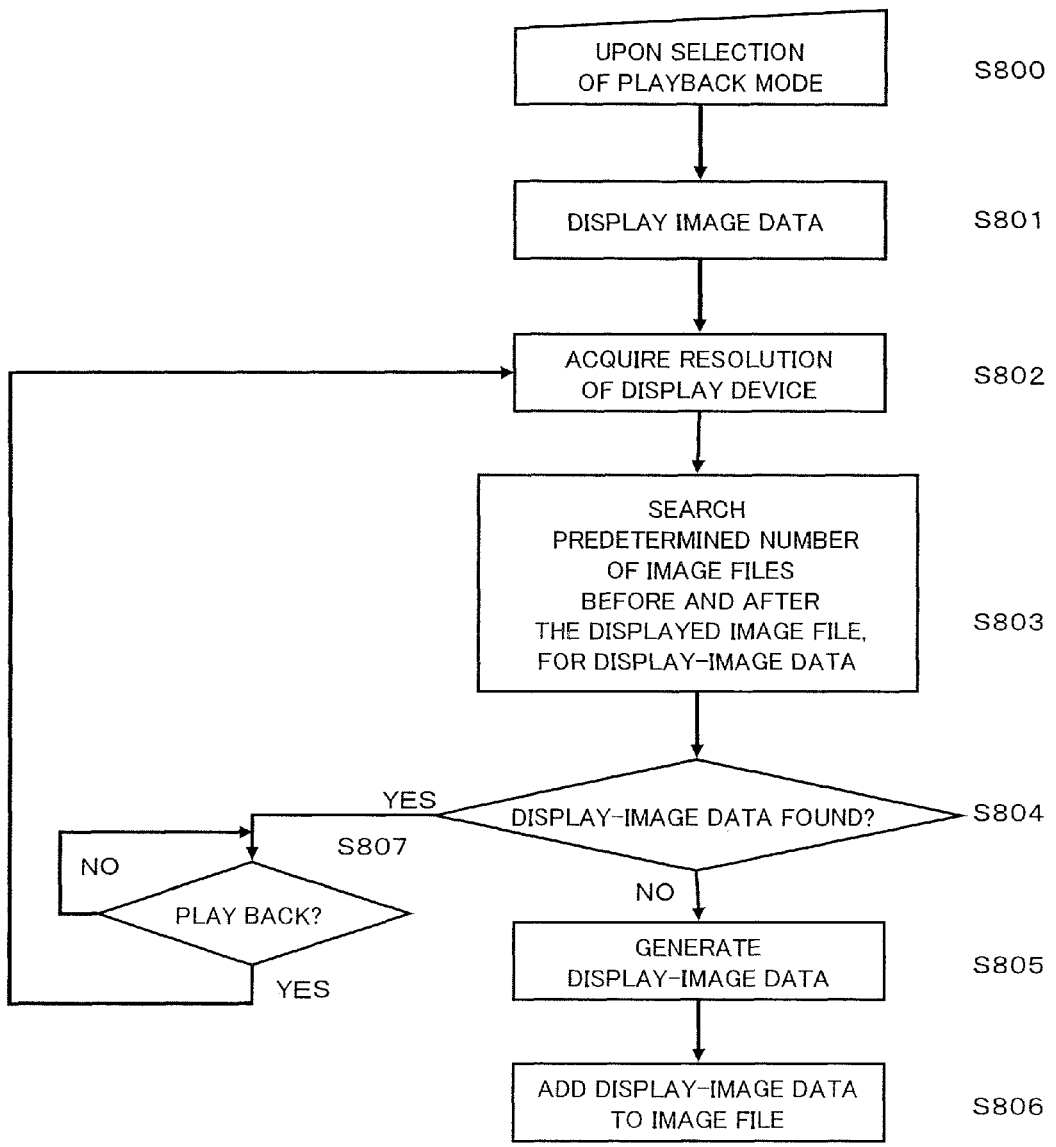
FIG. 20 is a flow chart of the display-image data generating process executed during reproduction of pictures.
Figure 21:
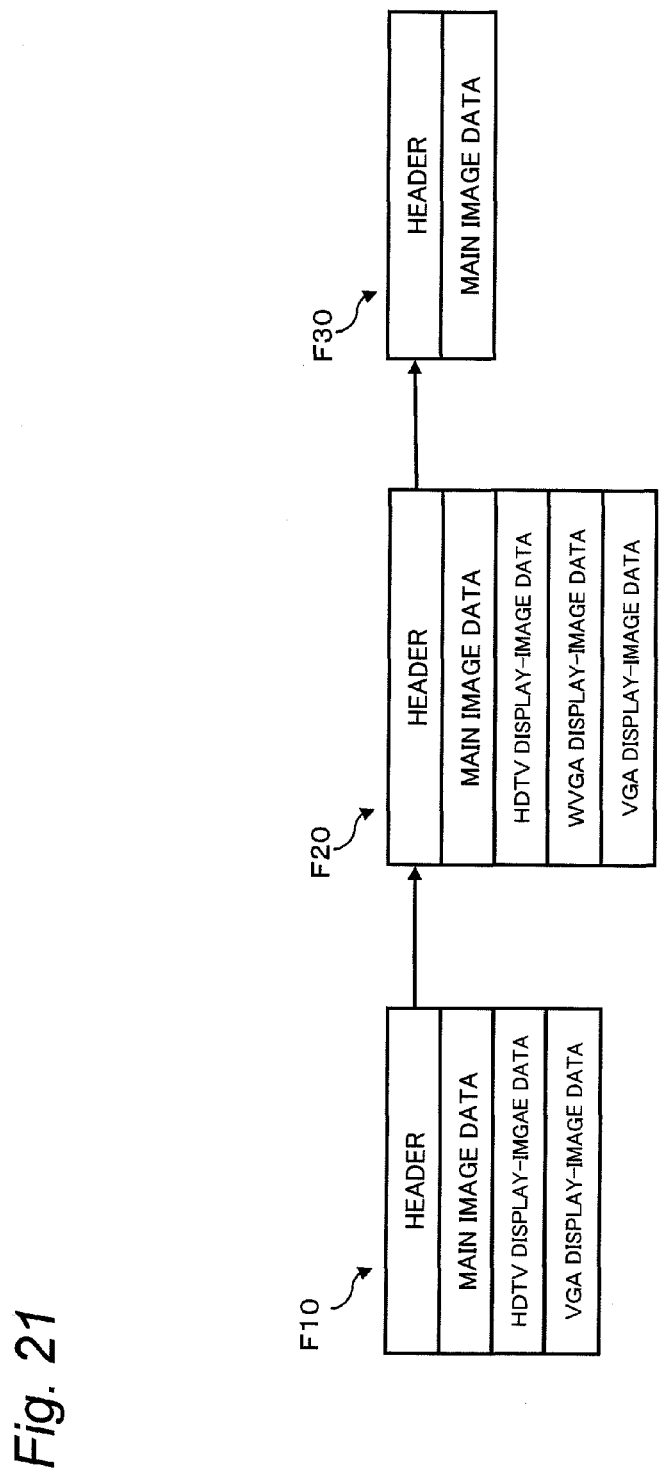
FIG. 21 shows the structure of image files stored in the memory card.

With reference to FIG. 20 and FIG. 21, other processes executed during image data reproduction are described next. FIG. 20 is a flow chart of another process executed during image data reproduction. FIG. 21 schematically describes the structure of image files stored in the memory card 108 or internal memory 109. FIG. 21 shows that image files are stored in the order of multiple image file F10, multiple image file F20, single image file F30. More specifically, the images are stored in the memory card 108 so that if forward reproduction is instructed by the user with the cursor key, the images are displayed in the sequence multiple image file F10→multiple image file F20→single image file F30, and if backward reproduction is instructed, the images are displayed in reverse order, that is, the images are displayed in the sequence single image file F30→multiple image file F20→multiple image file F10.

An operation with the digital camera 101 connected to an image display device is described next, when image data stored in the memory card 108 or internal memory 109 is displayed on the image display device. The image display device in this example is a high definition television (HDTV).

User's operation with the mode dial 174 sets the digital camera 101 to the reproduction mode (S800). When the reproduction mode is set, the LCD monitor 110 displays the image data which was reproduced last (S801). For example, if the last reproduced image data is related to the multiple image file F20 shown in FIG. 21, the VGA display-image data (or WVGA display-image data) stored in the multiple image file F20 is displayed on the LCD monitor 110, and the HDTV display-image data stored in the multiple image file F20 is simultaneously displayed on the image display device. When the image data is displayed, the controller 150 acquires the pixel count of the image display device from the image display device connected to the digital camera 101 (S802).

When the pixel count is acquired, the controller 150 determines if there is display-image data matching the specifications of the image display device in the image files (multiple image file F10 and single image file F30 in FIG. 21) stored in the memory card 108 or internal memory 109 within a predetermined number ("1" in the example shown in FIG. 21) of files before and after the multiple image file F20 (S803, S804). More specifically, the controller 150 determines if display-image data with a pixel count matching the pixel count of the image display device is found in the predetermined number of image files before and after the image being displayed.

If display-image data matching the pixel count of the image display device is found within the predetermined number of image files, the controller 150 does not create a new display image but waits for change by the user of the image data being reproduced on the display (S807). When the image data being reproduced is changed, the controller 150 repeats the process described above (S802 to S804).

If display-image data matching the pixel count of the image display device is not found within the predetermined number of image files, the controller 150 generates display-image data with the pixel count of the image display device for those image files (S805). For example, FIG. 21 shows that the multiple image file F10 includes HDTV display-image data but the single image file F30 does not HDTV display-image data. In this case, the controller 150 does not generate HDTV display-image data for the multiple image file F10, but generates HDTV display-image data for the single image file F30.

When the display-image data is generated, the controller 150 adds the generated display-image data to the image file (S806). For example, in FIG. 21 the generated HDTV display-image data is added to the single image file F30.

During reproduction of one image, this embodiment of the invention thus detects if display-image data matching the pixel count of the image display device is found in a predetermined number of image files before and after the image file storing the image data being displayed. If display-image data with the matching pixel count is not found, it generates and stores display-image data with the matching pixel count in that image file. Thus, display-image data matching the specifications (pixel count) of the image display device can be prepared for all image files within the predetermined number before and after the image file being displayed. Accordingly, the user can browse forward/backward rapidly through the stored images on the image display device. In addition, only display-image data matching the specifications of the image display device is created when generating the display-image data, and therefore the processor load and time required to generate the display-image data can be reduced.

The controller 150 adds the generated display-image data to the image file in this embodiment of the invention, but the generated display-image data may be stored to the buffer memory 115 instead. This configuration enables the user to rapidly display the image data without changing the image data stored in the image file.

This embodiment of the invention searches the image files within a predetermined number of files before and after the image file being displayed, but the invention is not so limited. For example, a predetermined number of image files may be searched only in the forward direction or only in the reverse direction.

This embodiment of the invention detects the presence of display-image data with the pixel count matching the pixel count of the image display device, and determines whether to create the display-image data. Alternatively, whether the type of image file within a predetermined number of files before and after the image file being displayed is a multiple image file or single image file may be determined. If the file type is a single image file, display-image data with a predetermined pixel count (for example, the pixel count of the image display device) may then be generated. In this case the display-image data may be generated and prepared in advance without getting the pixel count information from the image display device.

1-4 Transmission of Image Data

The digital camera 101 according to this embodiment of the invention can transmit already recorded image files and image data stored in the image files to an external device. This image file transmission operation is described next with reference to FIG. 22 and FIG. 23. The digital camera 101 according to this embodiment of the invention conforms to the PictBridge standard (detailed later).

1-4-1 Flow of Image File Transmission

Figure 22:
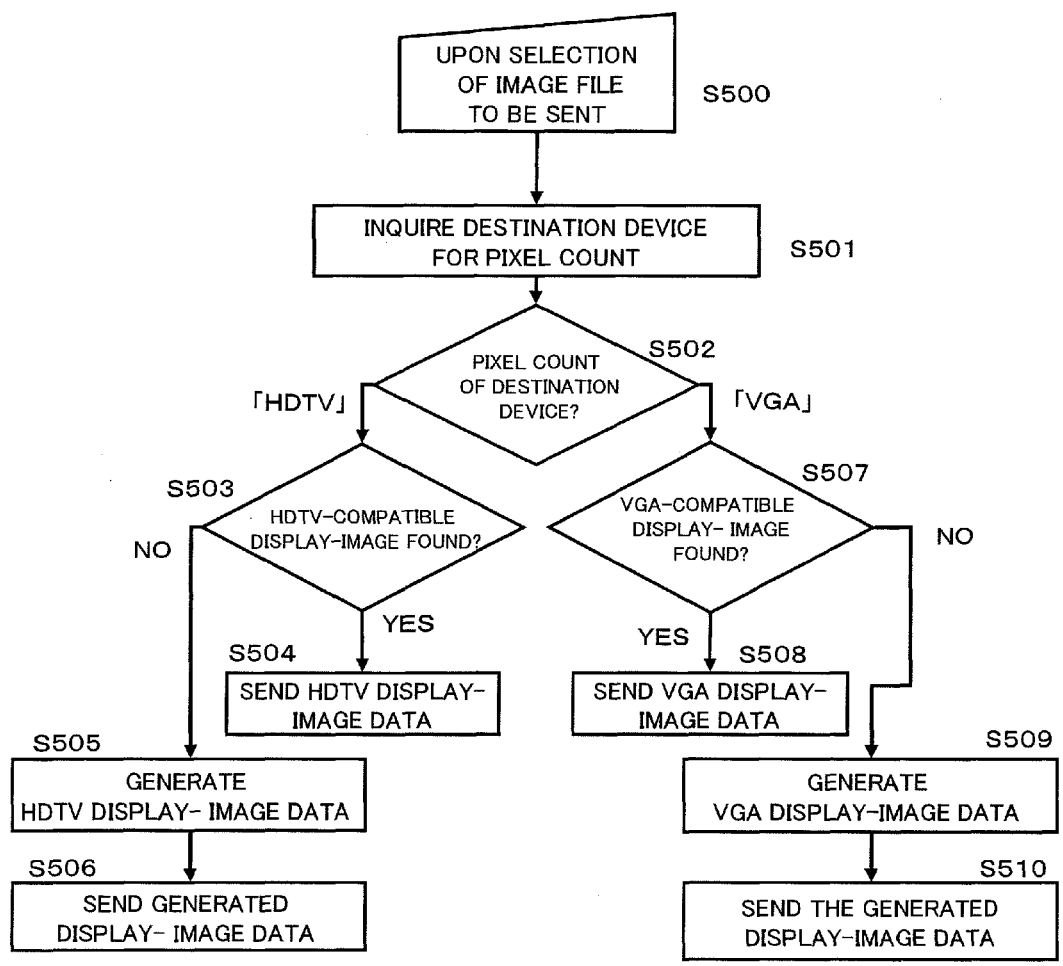
FIG. 22 is a flow chart of the process for automatically selecting the image data to be transmitted in a digital camera according to a preferred embodiment of the present invention.

With reference to FIG. 22, the operation for automatically selecting the image data to be transmitted in this embodiment of the invention is described next. FIG. 22 is a flow chart of the image file transmission process in this embodiment of the invention. When the user attempts to send a multiple image file to a device that is not compatible with the multiple image file format, the image data to be sent is automatically selected from the multiple image file.

In this embodiment of the invention, user's operation of the cursor key 180 selects an image file to be sent, during reproduction of the image data on the screen (S500). When the image file to be sent is selected, the controller 150 inquires at the destination device about a pixel count (S501).

The controller 150 determines the pixel count of the destination device based on the response from the destination device (S502). That is, the controller 150 determines the image data to be send based on an instruction from the destination device. If the pixel count of the destination device is equal to that of an HDTV device, the controller 150 determines if HDTV display-image data is in the image file selected by the user (S503).

If HDTV display-image data is found, the communication unit 111 sends the HDTV display-image data to the destination device (S504).

If HDTV display-image data is not found, the controller 150 generates HDTV display-image data based on the main image data in the image file selected by the user (S505). The communication unit 111 then sends the resulting display-image data to the destination device (S506).

If the pixel count of the destination device is equal to that of VGA, the controller 150 determines if VGA display-image data is stored in the image file selected by the user (S507).

If VGA display-image data is found, the communication unit 111 sends the VGA display-image data to the destination device (S508).

If VGA display-image data is not found, the controller 150 generates VGA display-image data based on the main image data in the image file selected by the user (S509). The communication unit 111 then sends the resulting display-image data to the destination device (S510).

The communication unit 111 can thus transmit display-image data with the pixel count suitable to the destination device by means of a configuration that sends display-image data according to the pixel count of the destination device.

In addition, the user can conduct a transmission operation without knowing the pixel count of the destination device, by means of a configuration that automatically selects image data conforming to the specification of the destination device.

If display-image data which is determined to be transmitted is not found, display-image data suitable for transmission may be automatically selected from the existing display-image data and sent. This configuration eliminates the need to generate display-image data and thus shortens the transmission time, when an image file that does not contain the conforming display-image data is transmitted.

One method of automatically selecting the display-image data may select the display-image data with the highest pixel count among the display-image data stored in the image file, which may then be transmitted. This simplifies selecting the image to be transmitted and enables displaying an image with the highest possible quality.

This embodiment of the invention describes a configuration compatible with two pixel counts, HDTV and VGA. However the invention may also be compatible with other pixel counts, such as WVGA, CIF, and QCIF. This enables automatically selecting and transmitting image data that best matches the pixel count of each of destination devices having different pixel counts.

This embodiment of the invention describes transmitting display-image data matching the pixel count of the destination device. However display-image data with an aspect ratio matching the aspect ratio of the destination device may be transmitted. This configuration enables the communication unit 111 to transmit image data with an aspect ratio suitable for the destination device. In addition, because the image data to be sent is automatically selected, the user can conduct a transmission operation without knowing the aspect ratio of the destination device.

This embodiment of the invention describes transmitting display-image data matching the pixel count of the destination device. However the display-image data to be sent may be selected based on the type of destination device. The type of destination device refers to classification by product, for example, a high definition television, an analog television, a digital camera, a personal computer, or the like.

By thus sending image data according to the type of destination device, the image data can be effectively classified when the number of destination device types is few. For example, if the destination device is a HDTV, image data with an aspect ratio of 16:9 can be transmitted, while if the destination device is an analog television, image data with an aspect ratio of 4:3 can be transmitted. Display-image data with a pixel count suitable to the destination external device can also be transmitted.

This embodiment of the invention selects the image data to be transmitted from the display-image data in the image file, but the image data may be selected from the main image data and the display-image data.

This enables transmitting of image data better suited to the device including devices used for image editing such as personal computers and digital cameras, instead of only to devices used primarily for displaying image such as televisions. This also prevents such problems as being unable to transmit image data to the external device.

1-4-2 PictBridge Compatibility

Figure 23:
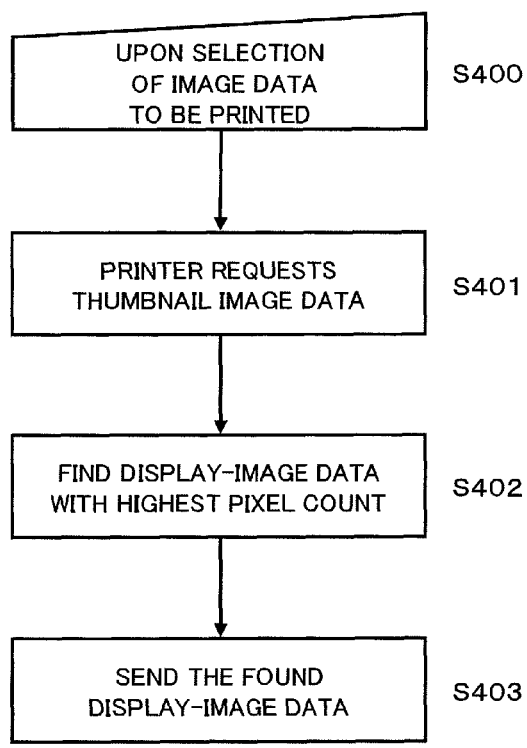
FIG. 23 is a flow chart describing the display-image data transmission operation in a preferred embodiment of the invention.

FIG. 23 is a flow chart of the process executed when the digital camera 101 according to this embodiment of the invention receives a transmission request for thumbnail image data from a PictBridge-compatible printer.

PictBridge is a standard enabling directly connecting a digital camera to a printer for easily printing digital pictures. When a PictBridge-compatible digital camera and printer are connected, image data stored in the digital camera can be printed directly from the printer. With the PictBridge standard, a transmission request for the image data to be printed is sent from the printer to the digital camera, and the digital camera then sends the image data to the printer in reply to the transmission request. The image data is thus printed. When a thumbnail image is printed according to the PictBridge standard, transmission of the thumbnail image data is requested.

Referring to FIG. 23, while the digital camera 101 and printer are connected, user's operation with the cursor key 180 of the digital camera 101 selects the image data to be printed (S400). When the image data is selected, the printer sends a transmission request for the image data and the corresponding thumbnail image data, to the digital camera 101 (S401). When the thumbnail image data is requested, the controller 150 of the digital camera 101 searches for the display-image data having the highest pixel count among display-image data related to the image data specified by the printer (S402). When the display-image data with the highest pixel count is found, the communication unit 111 sends this display-image data to the printer (S403). More specifically, when a transmission request for sending thumbnail image data is received from the printer, the digital camera 101 extracts the display-image data with the highest pixel count from the plural pieces of display-image data stored in the image file (S402), and sends it (S403).

Sharp image data with a high pixel count can thus be printed by sending display-image data with the highest pixel count in response to a display-image data transmission request from the printer. In addition, by deciding to always send image data with the highest pixel count, it is not necessary to determine what display-image data should be sent when transmitting the display-image data. The transmission operation is therefore simplified for the digital camera 101. In addition, transmitting display-image data shortens the transmission time compared with transmitting the main image data.

2. Second Embodiment

A second embodiment of a digital camera according to the present invention is described next. Aspects of the configuration and operation of this embodiment that are not described below are the same as in the first embodiment described above. The operation for automatically selecting image to be sent suitable for the specifications of the external device when image data is transmitted to an external device connected to the digital camera is described next.

2-1 Flow of Image File Transmission

Figure 24:
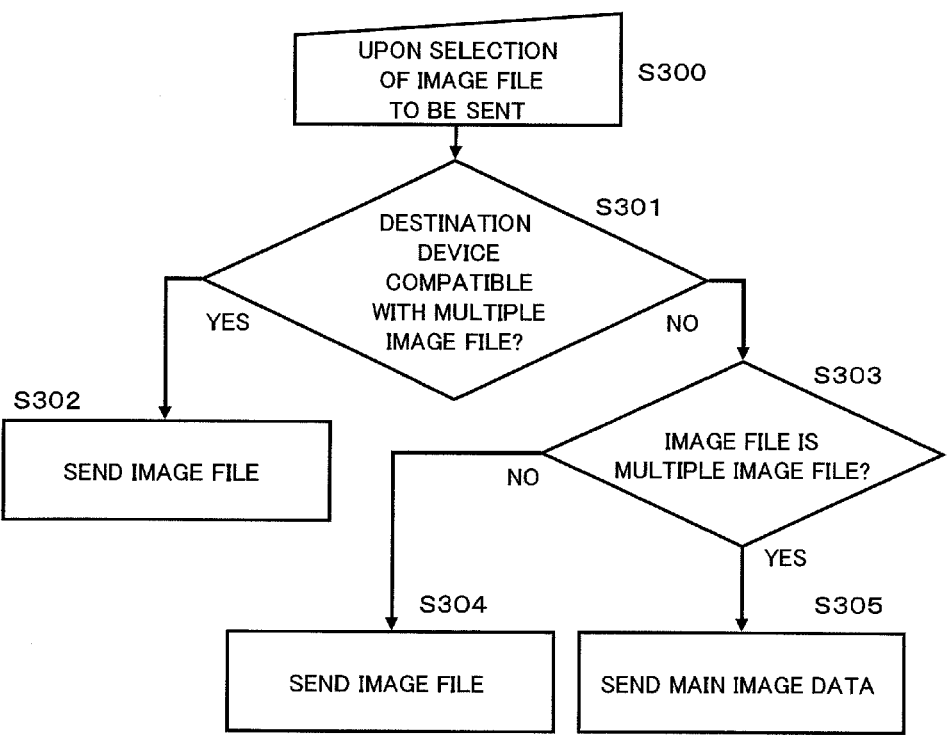
FIG. 24 is a flow chart describing the transmission operation of a digital camera according to a preferred embodiment of the present invention.

With reference to FIG. 24, the operation in this embodiment of the invention for automatically selecting the image data to be transmitted is described next. FIG. 24 is a flow chart of the process for automatically selecting the image data to be transmitted in this embodiment of the invention. In this embodiment of the invention, when the user attempts to send a multiple image file to an external device that is not compatible with the multiple image file format, image data to be transmitted suitable for the external device is automatically selected.

User's operation during reproduction of the image with the cursor key 180 of the digital camera 101 selects an image file for transmission (S300).

When an image file is selected, the controller 150 determines if the external device to which the image file is to be sent is compatible with the multiple image file format (S301). "Compatible with the multiple image file" means that the external device to which the file will be sent can recognize the received multiple image file as a multiple image file. Whether the external device is compatible with the multiple image file format is determined by acquiring from the external device an instruction indicating whether the external device can handle the display-image data.

If the external device is determined to be compatible with a multiple image file, the controller 150 sends the selected image file to the external device through the communication unit 111 (S302).

If the external device is determined to be not compatible with a multiple image file, the controller 150 determines if the selected image file is a multiple image file (S303).

If the selected image file is not a multiple image file (that is, it is a single image file), the controller 150 sends the selected image file to the external device (S304).

If the selected image file is determined to be a multiple image file, the controller 150 deletes all pieces of display-image data from the image file, and sends the image file storing only the main image data to the external device (S305).

The digital camera 101 according to this embodiment of the invention thus has a communication means that sends an image file from which the display-image data has been deleted through the communication means according to a command from an external device. As a result, if the destination external device is not compatible with the multiple image file format, the image file is converted to a single image file for transmission. As a result, even an external device that is not compatible with a multiple image file can handle the image file. The instruction from the external device therefore preferably indicates whether the external device can handle the display-image data.

3 Third Embodiment

A digital camera according to a third embodiment of the invention is described next. The configuration and operation of this embodiment that are not described below are the same as in the first embodiment described above.

In this embodiment of the invention the image file stores display-image data with the same aspect ratio as the main image data regardless of the value of the aspect ratio.

3-1 Generated Image File

Figure 25:
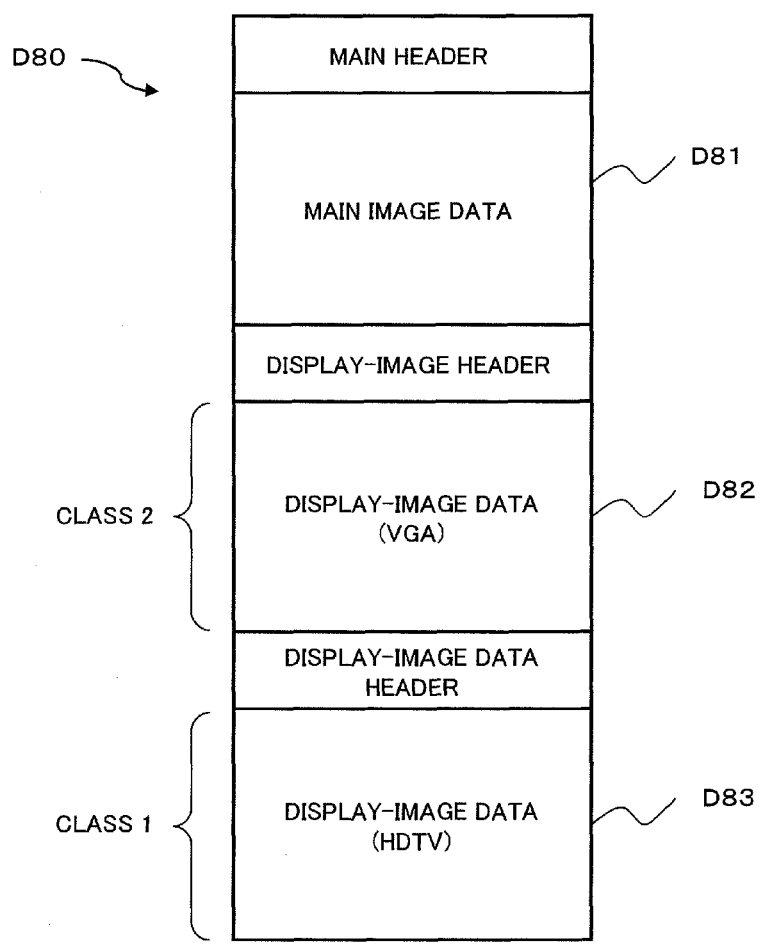
FIG. 25 shows the data structure of a multiple image file.

FIG. 25 shows the structure of the image file generated by the digital camera according to this embodiment of the invention. The Start Of Image marker and End Of Image marker are omitted in FIG. 25. The image file D80 stores main image data D81, VGA display-image data D82, and HDTV display-image data D83. The main image data D81 is generated by processing the image data captured by the CCD image sensor 141. The VGA display-image data D82 and HDTV display-image data D83 are generated based on the main image data D81. In this embodiment of the invention, VGA display-image data D82 and HDTV display-image data D83 are used by way of example as the display-image data, and these can be preset or set selectively. If set selectively, they can be selected by the user or automatically selection based on the imaging environment, for example.

The main image data D81, VGA display-image data D82, and HDTV display-image data D83 have the same aspect ratio. For example, if the aspect ratio of the main image data D81 is 4:3, the aspect ratio of both the VGA display-image data D82 and the HDTV display-image data D83 is also 4:3. If the aspect ratio of the main image data D81 is 16:9, the aspect ratio of both the VGA display-image data D82 and HDTV display-image data D83 is 16:9.

By thus rendering all display-image data with the same aspect ratio as the main image data, the aspect ratio of the display-image data is automatically determined when the aspect ratio of the main image data is set, so that processing is simplified.

3-2 Generating Method of the Display-Image Data

How the digital camera according to this embodiment of the invention generates the display-image data based on the main image data is described next.

3-2-1 When Aspect Ratio of the Main Image Data is 4:3

Figure 26:
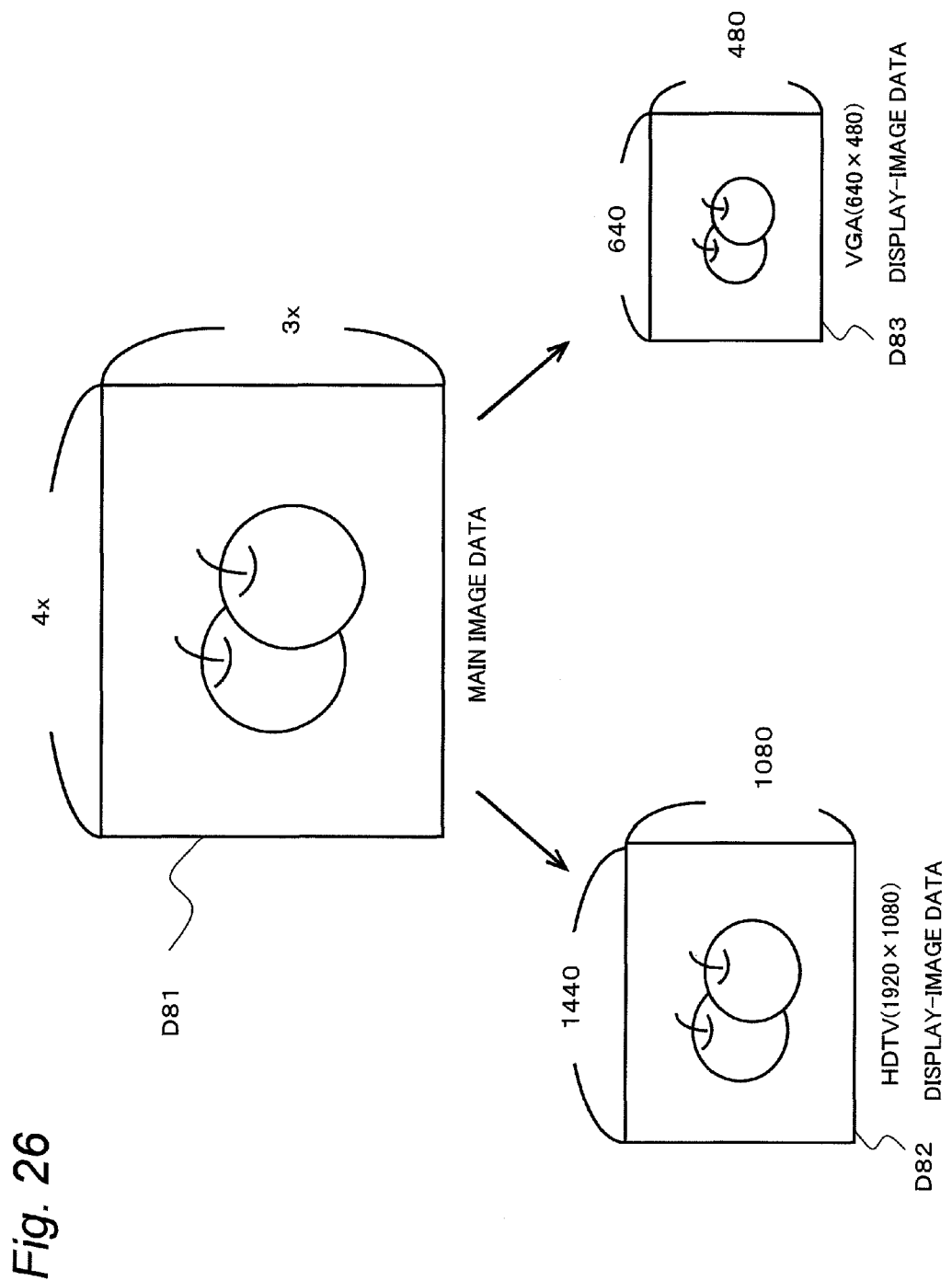
FIG. 26 describes a method of generating display-image data with the same aspect ratio as the main image when the aspect ratio is 4:3.

FIG. 26 is an explanatory view of a method for generating HDTV display-image data (pixel count: 1920 horizontal× 1080 vertical) or VGA display-image data (pixel count: 640 horizontal×480 vertical) based on main image data with an aspect ratio of 4:3. The pixel count of the main image data is, for example, 4000 horizontal×3000 vertical.

The size of an HDTV image is 1920 horizontal pixels× 1080 vertical pixels. The digital zoom processing unit 165 applies an image processing, such as cropping, subsampling, or interpolation, to the main image data D81 to make the HDTV display-image data D82 so that the HDTV display image fits in the HDTV pixel area (image size). More particularly, the digital zoom processing unit 165 generates the HDTV display-image data D82 so that the pixel count (image size) is the maximum pixel count that fits in the HDTV pixel area while keeping the aspect ratio the same as that of the main image (4:3). In this embodiment of the invention, therefore, the pixel count of the HDTV display-image data D82 is 1440 horizontal×1080 vertical. More specifically, the vertical pixel count of the HDTV display-image data D82 is the same as the vertical pixel count of the HDTV pixel area.

"The pixel count that fits in the pixel area" as used here means that both the horizontal pixel count and the vertical pixel count of the display-image data is less than or equal to a predetermined pixel count (for example, 1920 horizontal and 1080 vertical in the case of an HDTV image).

The VGA pixel area is 640 horizontal×480 vertical. The digital zoom processing unit 165 generates the VGA display-image data D83 to fit in the VGA image size by applying image processing, such as cropping, subsampling, or interpolation, to the main image data D81. The digital zoom processing unit 165 generates the VGA display-image data D83 so that the pixel count (image size) is the maximum pixel count that fits in the VGA pixel area while keeping the aspect ratio the same as that of the main image (4:3). In this embodiment of the invention, therefore, the pixel count of the VGA display-image data D83 is 640 horizontal×480 vertical. More specifically, the vertical pixel count and horizontal pixel count of the VGA display-image data D83 are equal to the vertical pixel count and horizontal pixel count of the VGA pixel area.

3-2-2 When Aspect Ratio of the Main Image Data is 16:9

Figure 27:
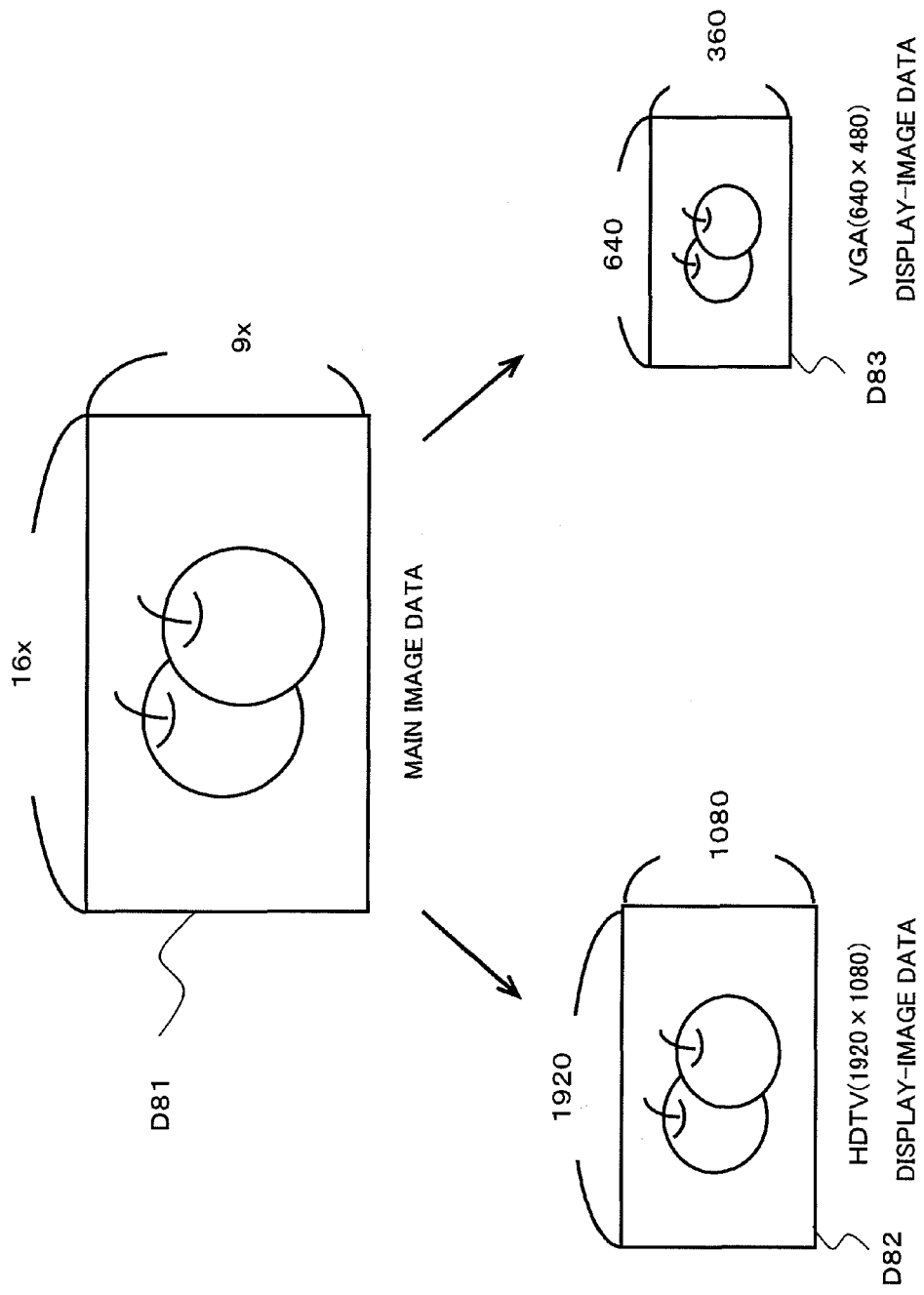
FIG. 27 describes a method of generating display-image data with the same aspect ratio as the main image when the aspect ratio is 16:9.

FIG. 27 is an explanatory view of a method for generating HDTV display-image data or VGA display-image data based on main image data with an aspect ratio of 16:9 in this embodiment of the invention.

Even when the aspect ratio of the main image data is 16:9, the display-image data is generated in the same way as that when the aspect ratio of the main image data is 4:3. The pixel count of the VGA display-image data D82 is therefore 1920 horizontal×1080 vertical in this embodiment of the invention. More specifically, the vertical pixel count and horizontal pixel count of the VGA display-image data D82 are the same as vertical pixel count and horizontal pixel count of the HDTV pixel area.

The pixel count of the VGA display-image data D83 is 640 horizontal×360 vertical. More specifically, the horizontal pixel count of the VGA display-image data D83 is the same as the horizontal pixel count of the VGA pixel area.

3-3 Summary of the Third Embodiment

As described above, a digital camera according to these embodiments of the invention has main image data acquisition means, display-image data generating means, and image file generating means. The main image data acquisition means acquires the main image data. The main image data acquisition means may be rendered by means of, for example, a CCD image sensor 141, an A/D converter 105 and an image processor 160. The display-image data generating means generates display-image data based on the main image data or the image data that is the source of the main image data under preset or selectively set conditions so that the display-image data can be generated to fit in a pixel area with a predetermined aspect ratio and predetermined vertical and horizontal pixel counts.

The display-image data generating means can be rendered by means of the digital zoom processing unit 165, for example. The image file generating means generates an image file including a header, main image data, and display-image data, and stores the display-image data in an area other than the header. The image file generating means can be rendered by the controller 150, for example.

Even if the aspect ratio of the main image data differs from the predetermined aspect ratio (the aspect ratio that is preset or selectively set in the digital camera), the display-image data generating means in this embodiment of the invention generates the display-image data so that the generated display image has the same aspect ratio as the main image data and fits in the pixel area described above. Therefore, even if the aspect ratio of the main image data differs from the set aspect ratio, the display-image data can be generated without changing the composition of the main image and without adding extra data.

For example, if it is configured that the image is added with black bands when the aspect ratio of the main image data differs from the set aspect ratio, the black bars may possibly be inserted where they are not needed. Likewise, if it is configured that the display-image data is generated by cropping the top and bottom of the main image data, a portion of the actual pixel area may possibly be deleted and the composition of the display-image data would differ from the composition of the main image data. To the contrary, the method of the invention described above, generates the display-image data without changing the composition of the main image and without adding extra data, thereby preventing unnecessarily increasing the size of the display-image data. Yet further, when sending data to an external device (printer, for example)

that requires only the essential part, the external device does not need to remove unnecessary parts from the display-image data.

The display-image data generating means in this embodiment of the invention generates the display-image data with the highest pixel count that fits in the pixel area. The display-image data generating means in this embodiment of the invention also generates the display-image data so that either the vertical or horizontal pixel count of the display-image data equals either the vertical or horizontal pixel count of the pixel area. As a result, display-image data with the highest resolution can be generated without changing the composition of the main image and without adding extra data.

4 Other Embodiments

The invention is described above with reference to preferred first to third embodiments of the invention, but the invention is not so limited. Variations such as described below are also conceivable, for example.

The optical system and drive system of a digital camera according to the present invention are not limited to those shown in FIG. 1. FIG. 1 shows an optical system with four lens groups, for example, but a different lens configuration may be used instead. The optical system is also rendered with a zoom lens 122 in FIG. 1, but a single-focus optical system without a zoom lens may be used instead. The OIS unit 124 is also not essential. The lenses may also be rendered using one or a plurality of lens elements. The zoom motor 132 and focus motor 135 may also be rendered using a single common motor.

The imaging element in the first to third embodiments described above uses a CCD image sensor 141, but the invention is not so limited. The imaging element may use a CMOS image sensor or an NMOS image sensor, for example.

The image processor 160 and controller 150 may also be rendered on a single semiconductor chip or on separate chips.

The display means in the first to third embodiments described above is an LCD monitor 110, but the invention is not so limited. An organic EL display or inorganic EL display may be used, for example.

The display-image data is generated based on main image data in JPEG format in the first to third embodiments described above. However the invention is not so limited. The display-image data may be generated based on YC data or RAW data from which the main image data is generated, for example. This configuration enables generating the display-image data in the process of generating the main image data, and therefore can simplify the generating the image data. That is, the display-image data can be generated based on the main image data or the image data that is source of the main image data, for example.

INDUSTRIAL APPLICABILITY

The invention is related to a method of generating, reproducing, and transmitting image files containing other display-image data in addition to or instead of thumbnail image data. Therefore the invention can be applied to devices that produce, display, and transmit images. For example, the invention can be applied to digital still cameras, movie cameras, and cell phones with a camera function.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims. The present disclosure relates to subject matter contained in Japanese Patent Application Nos. 2007-274999 filed on Oct. 23, 2007, and 2007-285001 filed on Nov. 1, 2007 which are expressly incorporated herein by reference in its entirety.

What is claimed is:

1. An image file generating apparatus comprising:
   a main image data acquisition unit configured to acquire main image data;
   a display-image data generator configured to generate display-image data based on the main image data or image data which is source data of the main image data; and
   an image file generator configured to generate an image file which includes a main header, the main image data, a display-image header and the display-image data, and in which the display-image data is stored in an area other than an area storing the main header, wherein
   the main header stores main image information which is information on the main image data and first display-image information which is image information on the display-image data,
   the display-image header stores second display-image information which is image information on the display-image data,
   the main image information and the second display-image information share at least one item of image information, and
   the shared item of image information includes different value between the main image information and the second display-image information.

2. The image file generating apparatus according to claim 1, wherein the image file is configured to store plural pieces of display-image data, and the plural pieces of display-image data are stored in the image file in a predetermined order.

3. The image file generating apparatus according to claim 1, wherein the image information included in the first display-image information contains an item related to the shared item.

4. The image file generating apparatus according to claim 1, wherein the shared item is an item indicating number of pixels.

5. The image file generating apparatus according to claim 4, wherein the image information included in the first display-image information contains an item related to number of pixels.

6. A method of generating an image file comprising:
   acquiring main image data;
   generating display-image data based on the main image data or image data which is source data of the main image data; and
   generating an image file which includes a main header, the main image data, a display-image header and the display-image data, and in which the display-image data is stored in an area other than an area storing the main header, wherein
   main image information which is information on the main image data and first display-image information which is image information on the display-image data are stored in the main header,
   second display-image information which is image information on the display-image data is stored in the display-image header,
   the main image information and the second display-image information share at least one item of image information, and
   the shared item of image information includes different value between the main image information and the second display-image information.

7. The method according to claim 6, wherein the image file is configured to store plural pieces of display-image data, and the plural pieces of display-image data are stored in the image file in a predetermined order.

8. The method according to claim 6, wherein the image information included in the first display-image information contains an item related to the shared item.

9. The method according to claim 6, wherein the shared item is an item indicating number of pixels.

10. The method according to claim 9, wherein the image information included in the first display-image information contains an item related to number of pixels.

* * * * *